(12) United States Patent
Kume et al.

(10) Patent No.: US 9,776,474 B2
(45) Date of Patent: Oct. 3, 2017

(54) WATER DISCHARGE DEVICE AND AIR CONDITIONING DEVICE WITH SAME

(71) Applicant: DENSO CORPORATION, Kariya, Aichi-pref. (JP)

(72) Inventors: Makoto Kume, Anjo (JP); Toshio Tsuboko, Anjo (JP); Seiji Kamei, Nagoya (JP); Tomohiro Kamiya, Takahama (JP); Syun Omori, Kariya (JP); Hirokazu Yamadaki, Kariya (JP); Shinichirou Hirai, Ichinomiya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 14 days.

(21) Appl. No.: 14/769,654

(22) PCT Filed: Jan. 27, 2014

(86) PCT No.: PCT/JP2014/000386
§ 371 (c)(1),
(2) Date: Aug. 21, 2015

(87) PCT Pub. No.: WO2014/129115
PCT Pub. Date: Aug. 28, 2014

(65) Prior Publication Data
US 2016/0001637 A1  Jan. 7, 2016

(30) Foreign Application Priority Data

Feb. 25, 2013 (JP) .................................. 2013-034931
Dec. 17, 2013 (JP) .................................. 2013-260444

(51) Int. Cl.
*F16T 1/20* (2006.01)
*B60H 1/32* (2006.01)
*F24F 13/22* (2006.01)

(52) U.S. Cl.
CPC ......... *B60H 1/3233* (2013.01); *F24F 13/222* (2013.01); *F24F 2013/227* (2013.01)

(58) Field of Classification Search
CPC .............. F24F 13/222; F24F 2013/227; Y10T 137/3068; F16T 1/22; F25D 21/14; F25D 2321/146; F25D 2321/147; B60H 1/3233
(Continued)

(56) References Cited

U.S. PATENT DOCUMENTS 1,448,972 A * 3/1923 Long .......................... F16T 1/22
                                                             137/192
3,197,973 A * 8/1965 Rannenberg ............ F25B 19/00
                                                             165/907
(Continued)

FOREIGN PATENT DOCUMENTS

EP       1741994 A1     1/2007
GB       2479772 A     10/2011
(Continued)

OTHER PUBLICATIONS

International Search Report and Written Opinion (in Japanese with English Translation) for PCT/JP2014/000386, mailed Apr. 28, 2014; ISA/JP.

*Primary Examiner* — Reinaldo Sanchez-Medina
(74) *Attorney, Agent, or Firm* — Harness, Dickey & Pierce, P.L.C.

(57) ABSTRACT

A water discharge device that collects and drains condensed water generated in an air conditioning device includes: a drainage path along which condensed water is able to be drained in a draining state in which condensed water is expelled; and an opening and closing member that is able to block and open the drainage path. The opening and closing member blocks the drainage path so as to limit movement of air due to dynamic pressure when in a non-draining state (Continued)

other than the draining state. The opening and closing member drains condensed water through the drainage path when in the draining state.

22 Claims, 17 Drawing Sheets

(58) Field of Classification Search
USPC .......... 137/192, 247.21, 247.23, 493.8, 526, 137/533.11; 62/272, 285, 288, 289
See application file for complete search history.

(56) References Cited

U.S. PATENT DOCUMENTS

| | | | | |
|---|---|---|---|---|
| 3,610,275 | A * | 10/1971 | Determan | F16K 31/22 137/430 |
| 3,905,203 | A * | 9/1975 | Jacob | F24F 3/1405 165/110 |
| 4,327,761 | A * | 5/1982 | Shelton | E03B 7/12 137/62 |
| 4,627,460 | A * | 12/1986 | Eising | F01N 3/005 137/192 |
| 4,856,550 | A * | 8/1989 | Smelcer | F16T 1/22 126/110 R |
| 5,115,798 | A * | 5/1992 | Moore, Jr. | F24H 8/006 122/14.1 |
| 5,421,360 | A * | 6/1995 | Castaneda | B01D 29/15 137/192 |
| 5,644,925 | A * | 7/1997 | Chaves | F24F 13/22 137/192 |
| 6,065,299 | A * | 5/2000 | Chen | F24F 13/224 62/277 |
| 6,931,882 | B1 | 8/2005 | Yang | |
| 7,412,987 | B2 * | 8/2008 | Kemper | F24D 3/1008 137/192 |
| 7,610,697 | B2 * | 11/2009 | Lee | F24F 13/222 137/131 |
| 7,854,238 | B2 * | 12/2010 | Zatarain | F25D 21/14 137/247.11 |
| 2003/0098061 | A1 * | 5/2003 | Stuchlik, III | F16T 1/22 137/192 |
| 2007/0137239 | A1 * | 6/2007 | Neumann | F25D 21/14 62/279 |
| 2011/0107783 | A1 * | 5/2011 | Bischofberger | F25D 21/14 62/288 |
| 2012/0012192 | A1 * | 1/2012 | Guba | F16K 24/044 137/202 |
| 2014/0331698 | A1 * | 11/2014 | Daley | F24F 13/224 62/80 |
| 2015/0285128 | A1 * | 10/2015 | Cardwell | F02B 29/0468 60/599 |

FOREIGN PATENT DOCUMENTS

| | | |
|---|---|---|
| JP | S50144262 A | 11/1975 |
| JP | S5972173 U | 5/1984 |
| JP | S60170212 U | 11/1985 |
| JP | H0115732 Y2 | 5/1989 |
| JP | H04347424 A | 12/1992 |
| JP | H06101862 A | 4/1994 |
| JP | H07279222 A | 10/1995 |
| JP | H085093 A | 1/1996 |
| JP | H0986152 A | 3/1997 |
| JP | 2000094946 A | 4/2000 |
| JP | 2000303531 A | 10/2000 |
| JP | 2001130244 A | 5/2001 |
| JP | 2001200565 A | 7/2001 |
| JP | 2002116289 A | 4/2002 |
| JP | 2002220861 A | 8/2002 |
| JP | 2004204710 A | 7/2004 |
| JP | 3112781 U | 8/2005 |
| JP | 2009154112 A | 7/2009 |
| JP | 2013019489 A | 1/2013 |

* cited by examiner

WATER DISCHARGE DEVICE AND AIR CONDITIONING DEVICE WITH SAME

CROSS REFERENCE TO RELATED APPLICATIONS

This application is a U.S. National Phase Application under 35 U.S.C. 371 of International Application No. PCT/JP2014/000386 filed on Jan. 27, 2014 and published in Japanese as WO 2014/129115 A1 on Aug. 28, 2014. This application is based on and claims the benefit of priority from Japanese Patent Application No. 2013-34931 filed on Feb. 25, 2013 and Japanese Patent Application No. 2013-260444 filed on Dec. 17, 2013. The entire disclosures of all of the above applications are incorporated herein by reference.

TECHNICAL FIELD

The present disclosure relates to a water discharge device that is able to drain condensed water, and to an air conditioning device that includes the water discharge device.

BACKGROUND ART

The water discharge device disclosed in Patent Literature 1 is known.

A water discharge device is installed in an air conditioning device mounted in a vehicle, and drains condensed water generated in the air conditioning device via a drain hose. Generally, the opened end of the drain hose is installed outside the vehicle passenger compartment, and the condensed water can be drained to the outside of the vehicle passenger compartment from the opened end.

There is concern that the opened end of a drain hose having this kind of configuration will become blocked due to mud adhering thereto, or due to insects invading and building a nest, and that the condensed water will not be drained. In this case, in order to remove mud adhering to the opened end or a foreign object such as an insect nest, it is necessary for a worker to burrow under the vehicle, or to remove a carpet or the like inside the vehicle passenger compartment and remove the foreign object, because of which working efficiency is poor. Also, it is necessary to check the opened end of the drain hose in order to determine the presence or otherwise of a foreign object.

PRIOR ART LITERATURES

Patent Literature

Patent Literature 1: JP 2000-94946 A

SUMMARY OF INVENTION

An object of the disclosure is to provide, at a low price, a water discharge device such that blockage of a drainage path for draining condensed water generated in an air conditioning device can be prevented.

According to an aspect of the present disclosure, a water discharge device that collects and drains condensed water generated in an air conditioning device includes: a drainage path along which condensed water is able to be drained in a draining state in which condensed water is expelled; and an opening and closing member that is able to block and open the drainage path. The opening and closing member blocks the drainage path so as to limit movement of air due to dynamic pressure when in a non-draining state other than the draining state. The opening and closing member drains condensed water through the drainage path when in the draining state.

According to this, the opening and closing member blocks the drainage path so as to limit movement of air due to dynamic pressure, that is, an air flow, when in a non-draining state. Because of this, the air flow essentially does not move through the drainage path. A configuration in which the air flow essentially does not move through the drainage path is such that a situation wherein insects or the like invade the interior of the water discharge device via the drainage path can be avoided, and in addition, a situation in which external air flows into the interior of the air conditioning device, and into the interior of the vehicle passenger compartment, via the drainage path can essentially be prevented. Furthermore, a situation in which conditioned-air flows to the exterior of the air conditioning device, and to the exterior of the vehicle, via the drainage path can essentially be prevented.

DESCRIPTION OF EMBODIMENTS

Figure 1:
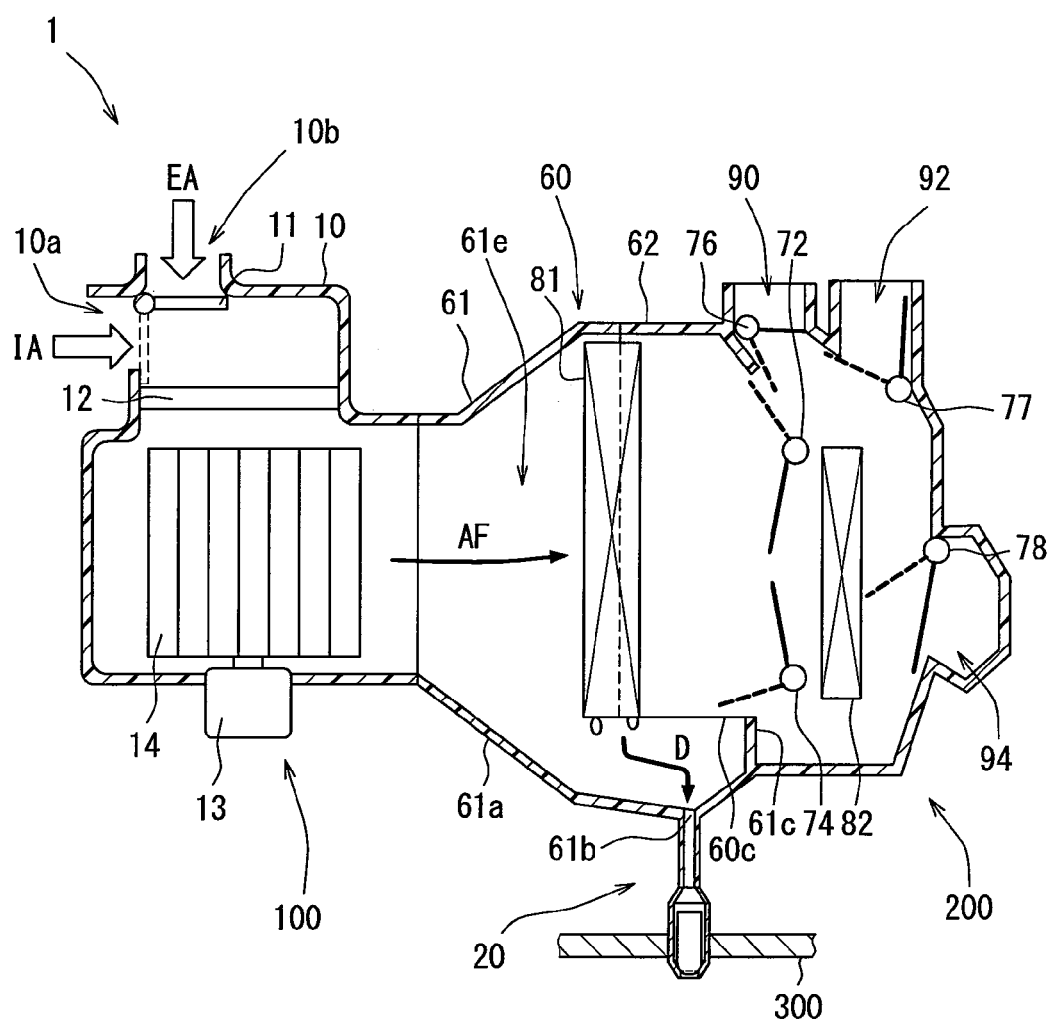
FIG. 1 is a schematic view showing a configuration of an air conditioning device including a water discharge device according to a first embodiment.
Figure 1:
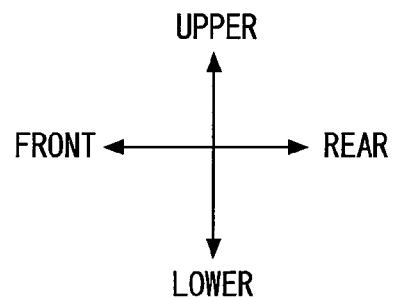

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As shown in FIG. 1, an air conditioning device 1 of this embodiment is mounted in a vehicle such as an automobile, and includes a blower unit 100 and an air conditioner unit 200. The air conditioning device 1 is installed in, for example, a space outside the vehicle passenger compartment behind the automobile instrument panel.

The blower unit 100 includes a fan 14, a motor 13, and a filter 12, and is configured with the fan 14, the motor 13, and the filter 12 housed in a resin blower case 10. An internal/external air switching door 11, which switches between an internal air inlet 10a that draws in internal air, as shown by IA in the drawing, and an external air inlet 10b that draws in external air, as shown by EA in the drawing, is rotatably installed in an upper portion of the blower case 10. The filter 12 removes foreign objects from the internal and external air drawn in. The fan 14 is driven by the motor 13, and feeds internal and external air that has passed through the filter 12.

The air conditioner unit 200 is connected downstream of the blower unit 100 in the air flow direction. The air conditioner unit 200 includes an evaporator 81, a heater core 82, and various kinds of door. The evaporator 81 is housed in a resin air conditioner case 61. The heater core 82 is housed in a resin heater case 62, and the various kinds of door are rotatably installed in the heater case 62.

The evaporator 81 is disposed vertically with respect to the air flow direction indicated by AF in the drawing so as to cross the whole of a path 61e. The evaporator 81 is fabricated by stacking tubes and fins formed of an aluminum alloy or the like, and integrally brazing. The evaporator 81, by absorbing the latent heat of vaporization of low-pressure low-temperature refrigerant that flows through a refrigerating cycle from air conditioning air passing through the evaporator 81, cools and dehumidifies the air conditioning air.

Air mixing doors 72 and 74 are disposed downstream (to the vehicle rear side) in the air flow direction from the evaporator 81. Each of the air mixing doors 72 and 74 is a horizontally long plate-form member, and is operated by a link mechanism and a servo motor. The air mixing doors 72 and 74 are shown as solid lines, and can rotate between a minimum heating position, in which a region upstream of the heater core 82 is blocked off, and a maximum heating position, in which the region upstream of the heater core 82 is opened.

The heater core 82 is disposed downstream (to the vehicle rear side) in the air flow direction from the air mixing doors 72 and 74. The heater core 82 is fabricated by stacking tubes and fins formed of an aluminum alloy or the like, and integrally brazing. The tubes of the heater core 82 form, for example, a path along which a high-temperature engine cooling water flows, and reheat cold air that has passed through the evaporator 81, with the engine cooling water as a heat source.

The heater case 62 has a DEF aperture portion 90, a FACE aperture portion 92, and a FOOT aperture portion 94, downstream in the air flow direction. The DEF aperture portion 90 is positioned in an upper portion of the air conditioner case 61, opens in the center in the front-back direction of the vehicle, and blows air conditioning air toward the inner surface of the vehicle windshield. The DEF aperture portion 90 is opened and closed by a DEF door 76. The FACE aperture portion 92 opens further to the vehicle rear side than the DEF aperture portion 90 in the upper portion of the air conditioner case 61, and blows air toward an occupant's head in the vehicle passenger compartment. The FACE aperture portion 92 is opened and closed by a FACE door 77. The FOOT aperture portion 94 opens to the vehicle rear side in the bottom surface of the air conditioner case 61, and blows air toward an occupant's feet in the vehicle passenger compartment. The FOOT aperture portion 94 is opened and closed by a FOOT door 78. Each of the DEF door 76, the FACE door 77, and the FOOT door 78 is of a plate-form, is linked to a servo motor via a link mechanism, and is driven between a fully-closed position shown by a dotted line and a fully-open position shown by a solid line.

By setting the degree of opening of the DEF door 76, the FACE door 77, and the FOOT door 78 in accordance with a predetermined blowing mode, the air conditioner unit 200 configured in this way enables operation of the blowing modes. The blowing modes are, for example, a FACE blowing mode, a B/L blowing mode, a FOOT blowing mode, a FOOTDEF blowing mode, a DEF blowing mode, and the like.

Figure 2:
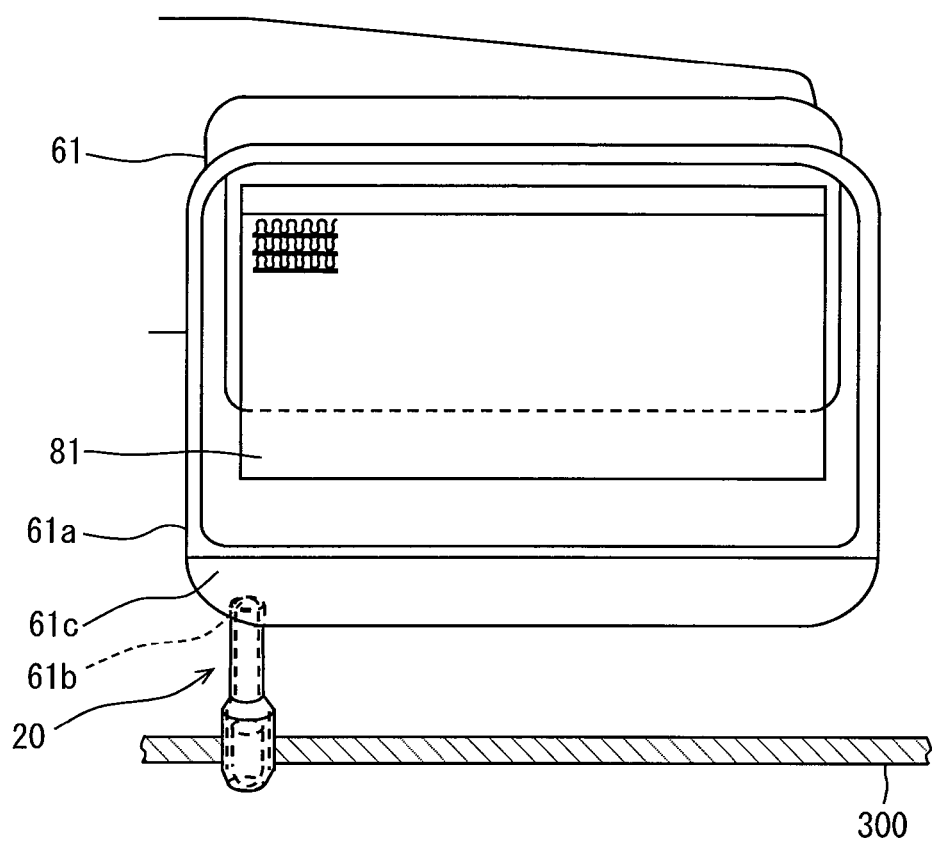
FIG. 2 is a perspective view showing one portion of the air conditioning device and the water discharge device according to the first embodiment.
Figure 2:
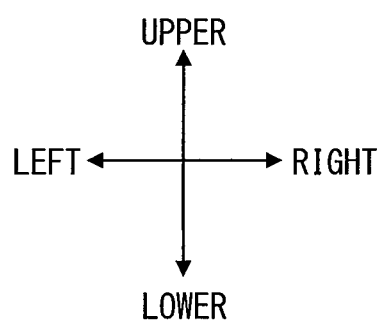

The air conditioner case 61 is divided from the heater case 62 along a dividing line 60c. FIG. 2 shows a state in which the air conditioner case 61 is seen from downstream in the air flow direction. In the following description, the air conditioner case 61 is called simply the case 61. As shown in FIG. 1 and FIG. 2, the case 61 forms a drain tank 61a downstream (to the vehicle rear side) in the air flow direction from the evaporator 81 and on the lower side in the drawing. The drain tank 61a forms a slope heading downward to the right in FIG. 1, and has a drain hole 61b. The drain tank 61a has a partition plate 61c downstream (to the vehicle rear side) in the air flow direction from the evaporator 81 and on the lower side in the drawing. In this way, the drain tank 61a has a capacity corresponding to a height having the drain hole 61b as the lower limit and the upper end of the partition plate 61c as the upper limit.

The evaporator 81, by absorbing the latent heat of vaporization of low-pressure low-temperature refrigerant that flows through the interior from air conditioning air, cools and dehumidifies the air conditioning air. At this time, moisture removed from the air conditioning air condenses, becoming water droplets and adhering to the surface of a core portion of the evaporator 81. Condensed water condensed in this way drips in the downward direction in the drawing, flows along the slope of the drain tank 61a, and falls into the drain hole 61b, as shown by an arrow D in FIG.

1. The drain hole 61b communicates with a water discharge device 20 that penetrates a floor plate 300 of the vehicle.

Figure 3:
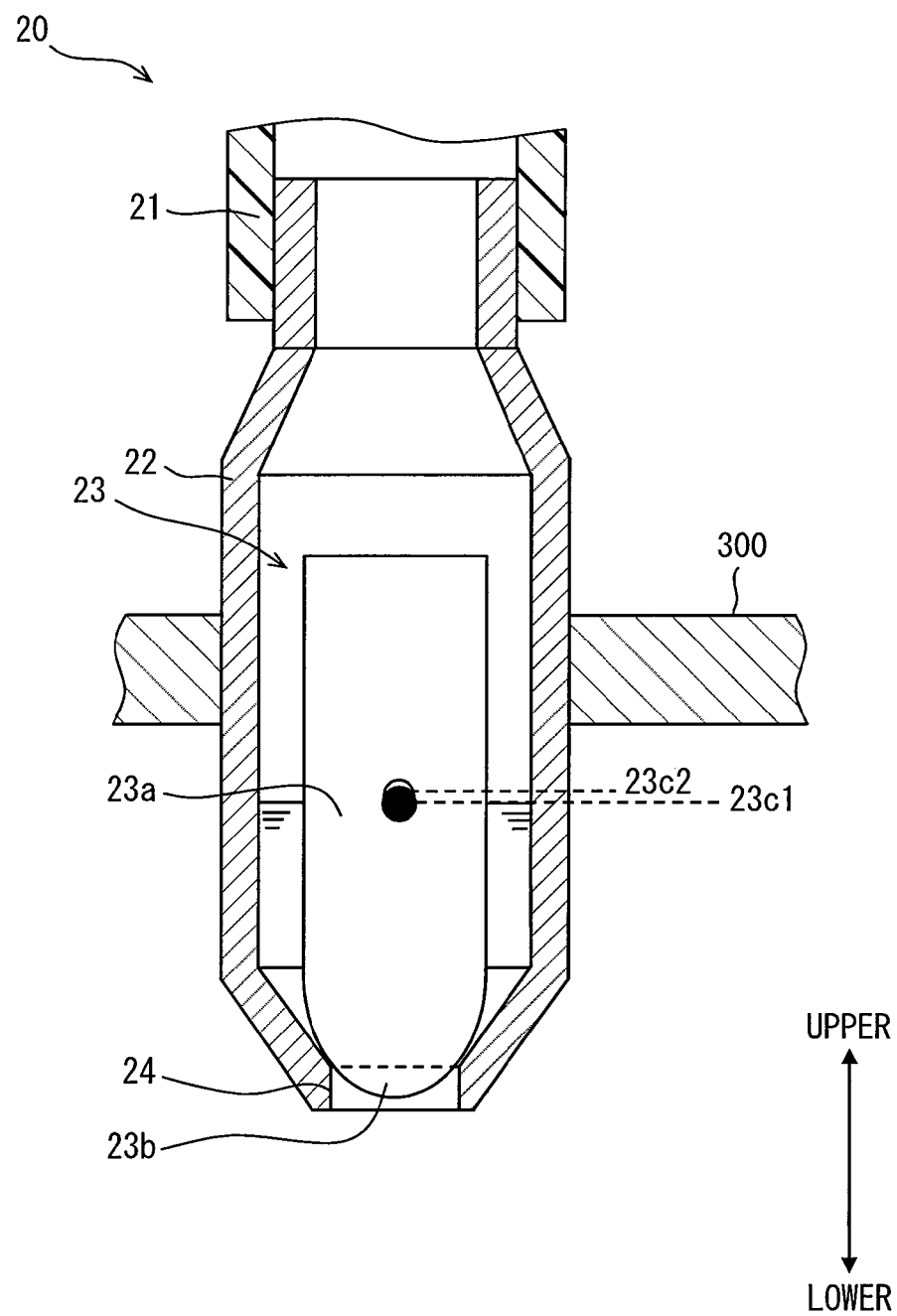
FIG. 3 is a partial sectional view showing the water discharge device according to the first embodiment.

As shown in FIG. 3, the water discharge device 20 is a float valve device configured of a drain hose 21, a housing portion 22, and a valve member 23. The drain hose 21 is connected to the drain tank 61a shown in FIG. 1 and FIG. 2, and communicates with the interior of the drain tank 61a via the drain hole 61b. The interior of the housing portion 22 communicates with the drain hose 21, and communicates with the interior of the drain tank 61a via the drain hose 21 and drain hole 61b. The valve member 23 is housed in the housing portion 22, and can be displaced in the interior of the housing portion 22 in the vertical direction in the drawing. The housing portion 22 has an aperture portion 24 in an end portion thereof on the lower side in the drawing. The aperture portion 24 is positioned below the floor plate 300 of the vehicle in the drawing, and communicates with the exterior of the vehicle. The aperture portion 24 configures a drainage path through which condensed water is able to drain in a draining state in which condensed water is expelled.

The drain hose 21 is formed of a resin material such as polypropylene or rubber, or the like. The housing portion 22 and the valve member 23 are formed of a metal material such as an aluminum alloy, a resin material such as polypropylene or rubber, or the like. The drain hose 21 and the housing portion 22 are formed as separate members, and are integrated by being connected to each other via a coupler or the like. Even when the position of the drain tank 61a and the position of the floor plate 300 of the vehicle deviate from each other, the deviation can be absorbed when the drain hose 21 is formed of a material with excellent flexibility. The valve member 23 is configured so as to float when immersed in condensed water. Consequently, the valve member 23 is formed, for example, to be hollow of a material with a density lower than that of condensed water.

The valve member 23 according to this embodiment is of a bullet form configured of a cylindrical form and a hemispherical form combined, and has a vertical cross-section such that a rectangle and a semi-circle are combined. In the disclosure, the form is called a cylindrical form, including the bullet form. The valve member 23 having this kind of form is obtained by, for example, forming a hollow body of a bullet form by draw processing an aluminum alloy, and closing an aperture end with an aluminum plate. Alternatively, the valve member 23 may be formed by a resin molding such as injection molding or blow molding.

In the state shown in FIG. 3, condensed water generated in the evaporator 81 described using FIG. 1 and FIG. 2 is accumulated as far as the water level shown in the drawing as a result of being collected in the housing portion 22 via the drain hole 61b and the drain hose 21. In the state shown in FIG. 3, the level of the condensed water collected in the housing portion 22 is lower than a predetermined water level to be described hereafter. In this state, the valve member 23 is displaced in a closing direction, corresponding to a downward direction in the drawing, by the weight of the valve member 23 and air blow pressure generated by an operation of the fan 14. In this way, the valve member 23 is seated on a peripheral edge portion of the aperture portion 24, thereby hermetically blocking the drainage path (aperture portion 24) and creating a non-draining state. In the non-draining state, the valve member 23 functions so as not to allow insects or the like to invade the interior of the housing portion 22 via the aperture portion 24 from the exterior of the vehicle. Furthermore, as the valve member 23 hermetically blocks the aperture portion 24 in this state, a situation in which air generated by an operation of the fan 14 leaks to the exterior of the vehicle via the aperture portion 24 can be avoided. Consequently, as a leakage of air via the aperture portion 24 can be avoided, a reduction in the amount of air fed into the vehicle passenger compartment via the various kinds of door can be avoided.

When the condensed water collected in the interior of the housing portion 22 reaches a predetermined water level, the valve member 23 floats owing to buoyancy acting because of the condensed water. The valve member 23 floating in this way is displaced in an opening direction, corresponding to an upward direction in the drawing, thereby opening the aperture portion 24 and creating a draining state. In the draining state, the valve member 23 expels the collected condensed water to the exterior of the vehicle from the aperture portion 24.

Figure 4:
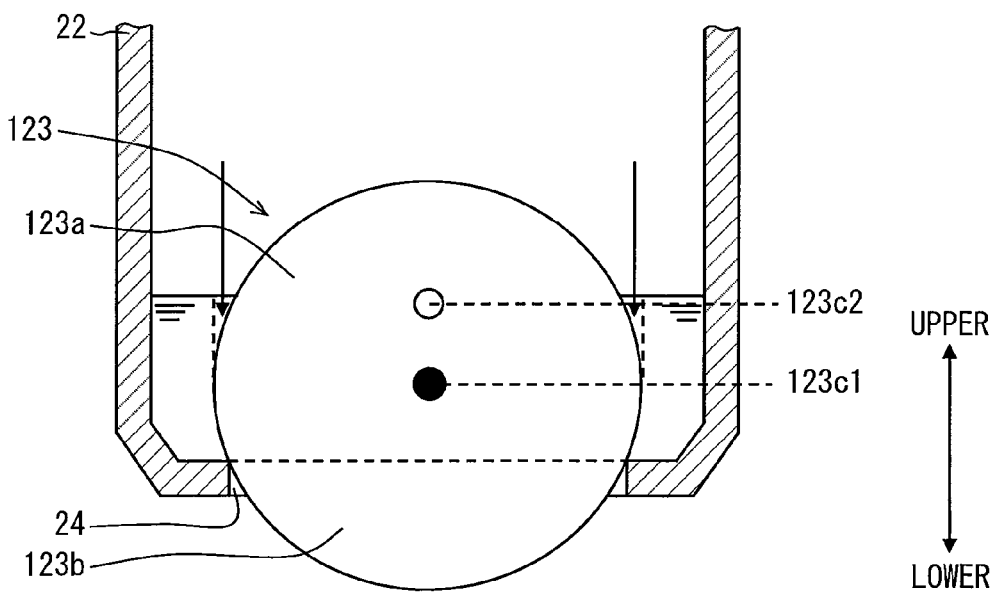
FIG. 4 is a partial sectional view showing a water discharge device of a comparison example of the first embodiment.

It is sufficient that the form of the valve member 23 is a form such that the aperture portion 24 can be hermetically blocked, and the valve member 23 can float in condensed water. In this embodiment, the bullet-form valve member 23 is used. Next, the reason for this will be explained. FIG. 4 shows an example wherein a spherical valve member 123 is employed, and shows a state in which the valve member 123 is seated in the aperture portion 24. In this state, the valve member 123 has a buoyancy affected portion 123a, positioned upward in the drawing from the position in which the valve member 123 is seated in the aperture portion 24, and a non-buoyancy affected portion 123b, positioned downward in the drawing from the position in which the valve member 123 is seated in the aperture portion 24. No buoyancy caused by the condensed water acts on the non-buoyancy affected portion 123b. A center of gravity 123c2 of the buoyancy affected portion 123a is in the position indicated by a white circle. The center of gravity 123c2 of the buoyancy affected portion 123a is in a position higher than a center of gravity 123c1 of the whole of the valve member 123 indicated by a black circle. Because of this, even when the level of the condensed water reaches the center of gravity 123c1 of the valve member 123, no buoyancy acts on the non-buoyancy affected portion 123b, because of which sufficient buoyancy is not generated in the valve member 123, and the valve member 123 does not float.

In a state in which the condensed water has risen above the center of gravity 123c1 of the valve member 123, as shown in FIG. 4, the gravitational force of the condensed water acts downward in the drawing (in the closing direction) on an outer peripheral portion positioned above the center of gravity 123c1 of the valve member 123, as shown by the arrows in the drawing. In this way, the gravitational force of the condensed water acts so as to impede the floating of the valve member 123 when the valve member 123 is of a spherical form. Because of this, there is a possibility that opening and closing of the valve member 123 will not be carried out correctly.

As opposed to this, the valve member 23 according to this embodiment is of a bullet form configured of a cylindrical form and hemispherical form combined, as described using FIG. 3. The valve member 23 has a buoyancy affected portion 23a, positioned upward in the drawing from the position in which the valve member 23 is seated in the aperture portion 24, and a non-buoyancy affected portion 23b, positioned downward in the drawing from the position in which the valve member 23 is seated in the aperture portion 24. A center of gravity 23c2 of the buoyancy affected portion 23a indicated by a white circle is in a position slightly higher than a center of gravity 23c1 of the whole of the valve member 23 indicated by a black circle.

Unlike the valve member 123 of spherical form shown in FIG. 4, the valve member 23 according to this embodiment is such that even when the level of the condensed water rises above the center of gravity 23c1 of the valve member 23, the gravitational force of the condensed water does not act downward in the drawing (in the closing direction) on the valve member 23. Furthermore, as heretofore described, the position of the center of gravity 23c2 of the buoyancy affected portion 23a does not differ greatly from the position of the center of gravity 23c1 of the whole of the valve member 23. Because of this, when the level of the condensed water rises above the center of gravity 23c1 of the bullet-form valve member 23, sufficient buoyancy acts on the valve member 23 in response to a small rise in the level of the condensed water, unlike the case of the valve member 123 of spherical form shown in FIG. 4, and the valve member 23 floats. In this way, the configuration in which the valve member 23 is of a bullet form is such that the valve member 23 can float in a state in which the level of the condensed water is comparatively low. Consequently, condensed water collected in the housing portion 22 is swiftly expelled, because of which an excessive accumulation of condensed water can be avoided. Furthermore, the height of the housing portion 22 is kept low, and the overall size of the device can thus be reduced.

Herein, in order to cause the valve member 23 to float easily, a configuration in which the thickness of the valve member 23 is reduced, thereby reducing the specific gravity of the valve member 23, can also be considered. When the thickness of the valve member 23 is reduced, however, there is concern that, for example, deformation, damage, or the like will occur when installing the valve member 23 in the housing portion 22. Consequently, as heretofore described, it is advantageous to adopt a configuration in which buoyancy acts effectively on the valve member 23 by adopting a bullet form (cylindrical form), or the like, as the form of the valve member 23.

In this embodiment, the valve member 23 and the housing portion 22 are installed at an end portion of the drain hose 21, but when the drain hose 21 is sufficiently large, for example, the valve member 23 and the housing portion 22 may be installed in the interior of the drain hose 21. Specifically, a housing portion having an aperture portion in which the valve member 23 can sit and house the valve member 23 may be formed integrally in the interior of the leading end of the drain hose. Alternatively, a housing portion that is a member separate from the drain hose, and which has an aperture portion in which the valve member 23 can sit and house the valve member 23, may be installed in the interior of the leading end of the drain hose.

The water discharge device 20 according to this embodiment collects and drains condensed water generated in the air conditioning device 1. The water discharge device 20 has a drainage path (the aperture portion 24) along which condensed water can be drained in a draining state in which condensed water is expelled. The water discharge device 20 includes an opening and closing member that can close and open the aperture portion 24. When in a non-draining state, the opening and closing member closes the aperture portion 24 so as to limit movement of air caused by dynamic pressure. When in a draining state, the opening and closing member is a drainage member that drains condensed water via the aperture portion 24.

The water discharge device 20 having this kind of configuration is such that, when in a non-draining state, the opening and closing member closes the aperture portion 24 so as to limit movement of air, that is, an air flow, caused by dynamic pressure. Because of this, the air flow essentially does not move through the aperture portion 24. The configuration in which the air flow essentially does not move through the aperture portion 24 is such that a situation in which insects or the like invade the interior of the water discharge device 20 via the aperture portion 24 can be avoided, and in addition, a situation in which external air flows into the interior of the air conditioning device 1, and into the interior of the vehicle passenger compartment, via the aperture portion 24 can essentially be prevented. In the disclosure, a state in which the aperture portion 24 is closed so as to limit movement of air caused by dynamic pressure means a state in which movement of vapor or liquid on which static pressure acts is permitted under certain conditions, as will be described hereafter in a second embodiment.

The opening and closing member according to this embodiment is the valve member 23. The water discharge device 20 further includes the housing portion 22. The housing portion 22 has the aperture portion 24, houses the valve member 23 so as to be displaceable in an opening direction, thus opening the aperture portion 24, and a closing direction, thus closing the aperture portion 24, and can collect condensed water in the interior of the housing portion 22. The valve member 23 hermetically blocks the aperture portion 24 by sitting under its own weight on a bottom portion of the housing portion 22 (a peripheral edge portion of the aperture portion 24). The valve member 23 is displaced in the opening direction by floating in the condensed water collected in the housing portion 22, thereby creating a draining state, and opens the aperture portion 24 by separating from the aperture portion 24.

This kind of configuration is such that the collected condensed water can be automatically expelled by the valve member 23 floating at the point at which the level of the condensed water collected in the housing portion 22 reaches a predetermined value. That is, the water discharge device 20 can essentially be configured of the valve member 23 and the housing portion 22, because of which the water discharge device 20 can be of a simple configuration. In addition, the aperture portion 24 is hermetically blocked by the valve member 23 when in a non-draining state other than the draining state, because of which movement of air through the aperture portion 24 can essentially be prevented. As a result of this, an inflow of external air and an outflow of air conditioning air can be effectively limited.

Furthermore, the configuration is such that the aperture portion 24 is mechanically opened and closed by movement of the valve member 23, because of which the aperture portion 24 can be set to be sufficiently large in accordance with the size of the portion of the valve member 23 sitting on the aperture portion 24. In addition, when the valve member 23 opens and closes the aperture portion 24, movement of the valve member 23 occurs, and a collected fixed amount of condensed water flows out through the aperture portion 24. Because of this, even when, for example, mud adheres to the aperture portion 24, or insects or the like build a nest on the outer side of the aperture portion 24, the mud, nest, or the like is broken up by the movement of the valve member 23, and washed away by the condensed water. Because of this, a situation in which the aperture portion 24 is blocked by mud, an insect nest, or the like can easily be avoided.

In this disclosure, being able to block hermetically refers to a state in which movement of vapor or liquid is essentially prevented, regardless of the action of dynamic pressure or static pressure. A state in which movement of vapor or liquid is essentially prevented refers to, for example, a state in which a leakage of the extent of the leakage from the sitting float valve is allowed.

In this embodiment, the valve member 23 is of a cylindrical form. When employing, for example, the valve member 123, which is of a spherical form as described in the comparison example, one portion of the collected condensed water acts so as to press the valve member 123 against the aperture portion 24. Because of this, a case in which buoyancy caused by the condensed water does not act effectively on the valve member 123 is envisaged. As opposed to this, when employing the cylindrical-form valve member 23, a situation in which the condensed water acts so as to press the valve member 23 against the aperture portion 24 can be prevented, as heretofore described. Because of this, there is no need for the cylindrical-form valve member 23 to be lighter than the spherical-form valve member 123, because of which the thickness of the valve member 23, which is, for example, hollow, can be set to be large, whereby the rigidity of the valve member 23 can be increased.

The opening and closing member according to this embodiment is installed at the leading end, or in the interior, of the drain hose 21 positioned on the exterior of the air conditioning device 1. The water discharge device 20 having this kind of configuration can be applied to the existing air conditioning device 1 simply by changing the specifications of the drain hose 21, support member of the drain hose 21, and the like, of the existing air conditioning device 1. Consequently, there is no need to greatly change the design of the existing air conditioning device 1, and a rise in cost can therefore be restricted.

Modification of First Embodiment

Figure 5:
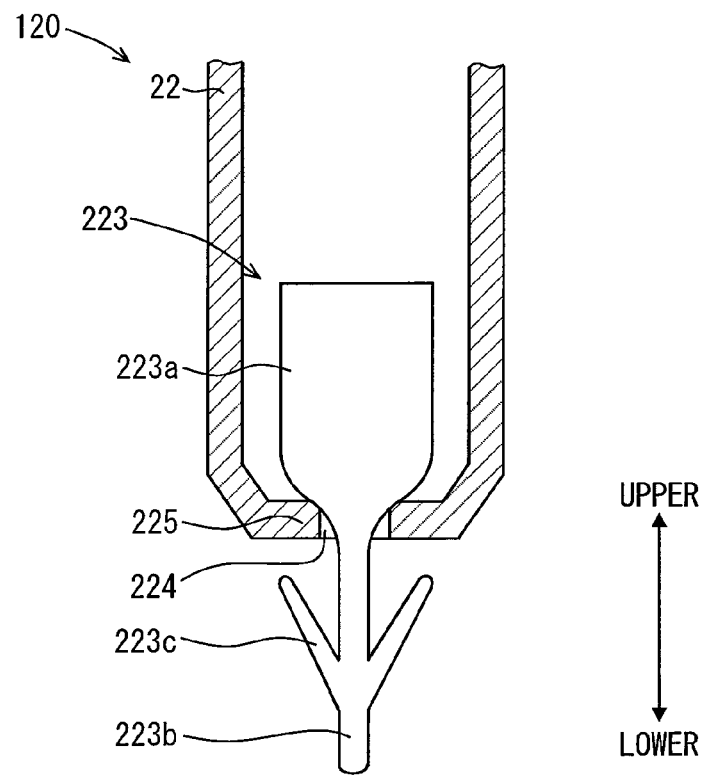
FIG. 5 is a partial sectional view showing a water discharge device according to a modification of the first embodiment.

A housing portion 22 of a water discharge device 120 according to a modification of the first embodiment shown in FIG. 5 has an aperture portion 224 smaller than an aperture portion of the first embodiment. The housing portion 22 houses a valve member 223. The valve member 223 includes a main body portion 223a, a leading end portion 223b extending from an end portion of the main body portion 223a, and folded portions 223c extending radially in a radial direction from the leading end portion 223b. The housing portion 22 has a wall portion 225 in which the aperture portion 224 is formed. Owing to the leading end portion 223b penetrating the wall portion 225, the main body portion 223a is positioned on the opposite side of the wall portion 225 from the leading end portion 223b and the folded portions 223c. The main body portion 223a hermetically blocks the aperture portion 224 by sitting on the wall portion 225 under the weight of the main body portion 223a. The folded portions 223c limit displacement in the opening direction of the main body portion 223a by coming into contact with the wall portion 225 in a state in which the main body portion 223a is separated from the aperture portion 224. The aperture portion 224 configures a drainage path through which condensed water is able to drain in a draining state in which condensed water is expelled.

The valve member 223 having this kind of configuration can be installed by, for example, snap fitting to the wall portion 225 in which the aperture portion 224 is formed. Herein, when mounting the air conditioning device 1 in a vehicle, a situation in which, for example, the air conditioning device 1 is steeply inclined, becoming temporarily upside-down, is also envisaged. Also, when the vehicle runs over unpaved ground too, a situation in which the air conditioning device 1 is steeply inclined is envisaged. Even in these kinds of situation, the valve member 223 installed in the housing portion 22 via the folded portions 223c does not fall out of the housing portion 22 or the air conditioning device 1. Because of this, working efficiency when installing the air conditioning device 1 increases, and a problem caused by the valve member 223 falling out while the vehicle is moving can be avoided. Also, the main body portion 223a of the valve member 223 may be of a bullet form (cylindrical form), as shown in FIG. 5. In this case, buoyancy can be caused to act effectively on the main body portion 223a, as heretofore described.

Second Embodiment

Figure 6:
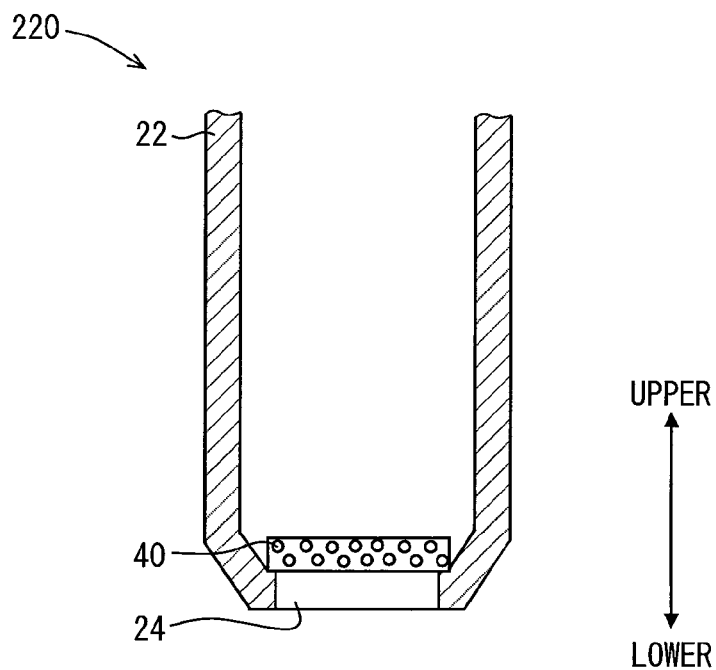
FIG. 6 is a partial sectional view showing a water discharge device according to a second embodiment.

Next, a water discharge device 220 according to a second embodiment will be described. As shown in FIG. 6, the water discharge device 220 according to this embodiment includes a porous member 40 in place of the valve member 23 described in the first embodiment. The porous member 40 is of a dish form, and is installed in a housing portion 22 so as to cover an aperture portion 24. The porous member 40 is, for example, a plate-form sponge, which is an expanded resin, cut out into a circular form. Herein, the porous member 40 is obtained by, for example, compressing a sponge formed by once expanding a resin, thereby bursting internal air bubbles and causing the air bubbles to communicate with each other. When the porous member 40 obtained in this way absorbs condensed water and swells, the absorbed condensed water can be caused to move through the internal air bubbles. Furthermore, the porous member 40 has in the interior thereof air bubbles communicating with each other to an extent that movement of a vapor accompanying dynamic pressure, that is, wind or an air flow, essentially does not permeate.

The porous member 40 configured in this way is in a non-draining state in a state in which no condensed water is collected in the housing portion 22 of the water discharge device 220. In the non-draining state, the porous member 40 blocks the aperture portion 24 so as to limit air movement caused by dynamic pressure. When condensed water is collected in the housing portion 22 of the water discharge device 220, the condensed water seeps into the porous member 40 due to static pressure generated in accordance with the level of the collected condensed water acting on the condensed water. As a result of the porous member 40 absorbing condensed water in this way and swelling until the condensed water cannot be retained, a draining state is created. In the draining state, the condensed water leaks into the aperture portion 24 from the porous member 40.

The opening and closing member according to this embodiment is the porous member 40, which is porous and covers the aperture portion 24. The water discharge device 220 further includes the housing portion 22, which has the aperture portion 24, houses the porous member 40, and can collect condensed water in the interior thereof. The porous member 40 creates a draining state by absorbing the collected condensed water and swelling, and the absorbed condensed water flows out from the porous member 40 and is drained from the aperture portion 24. The porous member 40 having this kind of configuration has a multiple of microscopic voids small enough to block so as to limit air movement caused by dynamic pressure when in a non-draining state. Because of this, an air flow essentially does not move through the aperture portion 24, and a situation in which insects or the like invade the interior of the water discharge device 220 through the aperture portion 24 can be avoided. Furthermore, as the water discharge device 220 can essentially be configured of the porous member 40, the water discharge device 220 can be of a simple configuration.

Third Embodiment

Figure 7:
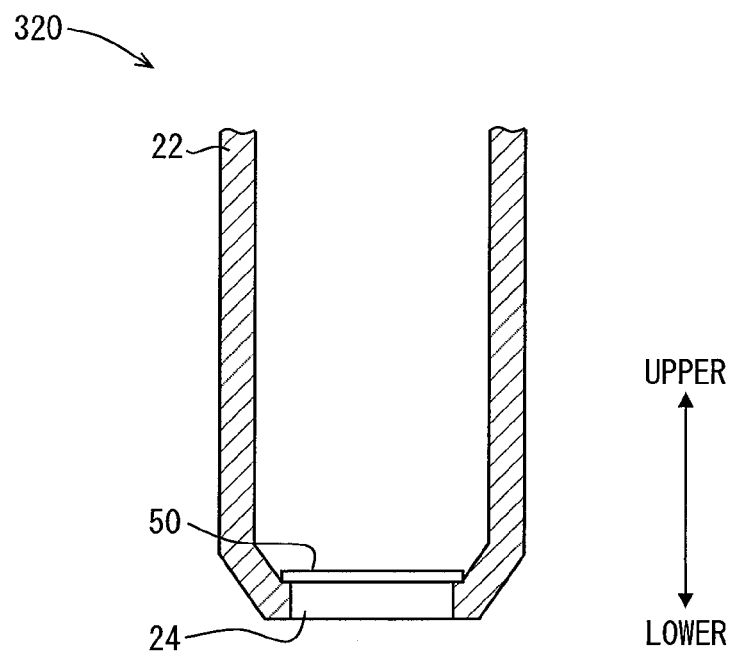
FIG. 7 is a partial sectional view showing a water discharge device according to a third embodiment.

Next, a water discharge device 320 according to a third embodiment will be described. As shown in FIG. 7, the water discharge device 320 according to this embodiment includes a water soluble member 50 in place of the valve member 23 described in the first embodiment. The water soluble member 50 is of a dish form, and is installed in a housing portion 22 so as to hermetically cover an aperture portion 24. The water soluble member 50, for example, may be formed of a so-called oblate obtained by forming starch or the like into a film form, or may be formed of a water soluble resin such as a water soluble nylon resin.

The water soluble member 50 configured in this way is in a non-draining state in a state in which no condensed water is collected in the housing portion 22 of the water discharge device 320. In the non-draining state, the water soluble member 50 hermetically blocks the aperture portion 24. When condensed water is collected in the housing portion 22 of the water discharge device 320, the water soluble member 50 is dissolved by the condensed water, and the aperture portion 24 is opened, thereby creating a draining state. In the draining state, the water soluble member 50 dissolves away through the aperture portion 24 together with the condensed water.

The opening and closing member according to this embodiment is the water soluble member 50, which is water soluble, covers the aperture portion 24, and hermetically blocks the aperture portion 24. The water discharge device 320 further includes the housing portion 22, which has the aperture portion 24, houses the water soluble member 50, and can collect condensed water in the interior thereof. The water soluble member 50 creates a draining state by being dissolved in the collected condensed water, thereby opening the aperture portion 24. When in a non-draining state, the water soluble member 50 having this kind of configuration hermetically blocks the aperture portion 24. Because of this, an air flow does not move through the aperture portion 24, and a situation in which insects or the like invade the interior of the water discharge device 320 through the aperture portion 24 can be avoided. Furthermore, as the water discharge device 320 can essentially be configured of the water soluble member 50, the water discharge device 320 can be of a simple configuration.

Fourth Embodiment

Figure 8:
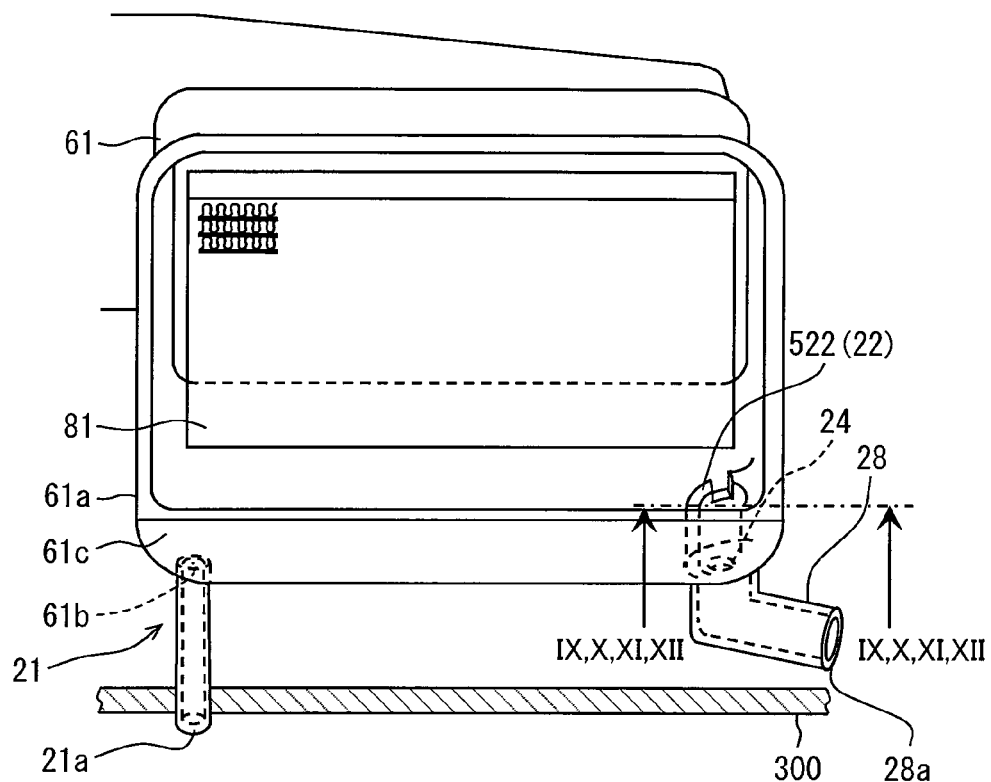
FIG. 8 is a perspective view showing one portion of an air conditioning device and a water discharge device according to a fourth embodiment.
Figure 8:
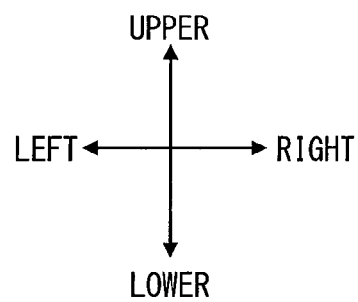

Next, a water discharge device 420 according to a fourth embodiment will be described. In the first to third embodiments, a water discharge device includes a drain hose 21, and a valve member 23, a porous member 40, or a water soluble member 50, which are opening and closing members, is installed at the leading end, or in the interior, of the drain hose 21. As opposed to this, the water discharge device according to this embodiment has a peripheral wall portion 522 integrally molded in rib form in one portion of a drain tank 61a of a case 61, as shown in FIG. 8. The peripheral wall portion 522 forms one portion of a housing portion 22. In this embodiment too, the drain hose 21 is installed on the left side in the drawing. The drain hose 21 has an open end 21a on the lower side in the drawing. The open end 21a is positioned below the floor plate 300 of the vehicle in the drawing, and communicates with the exterior of the vehicle.

Figure 9:
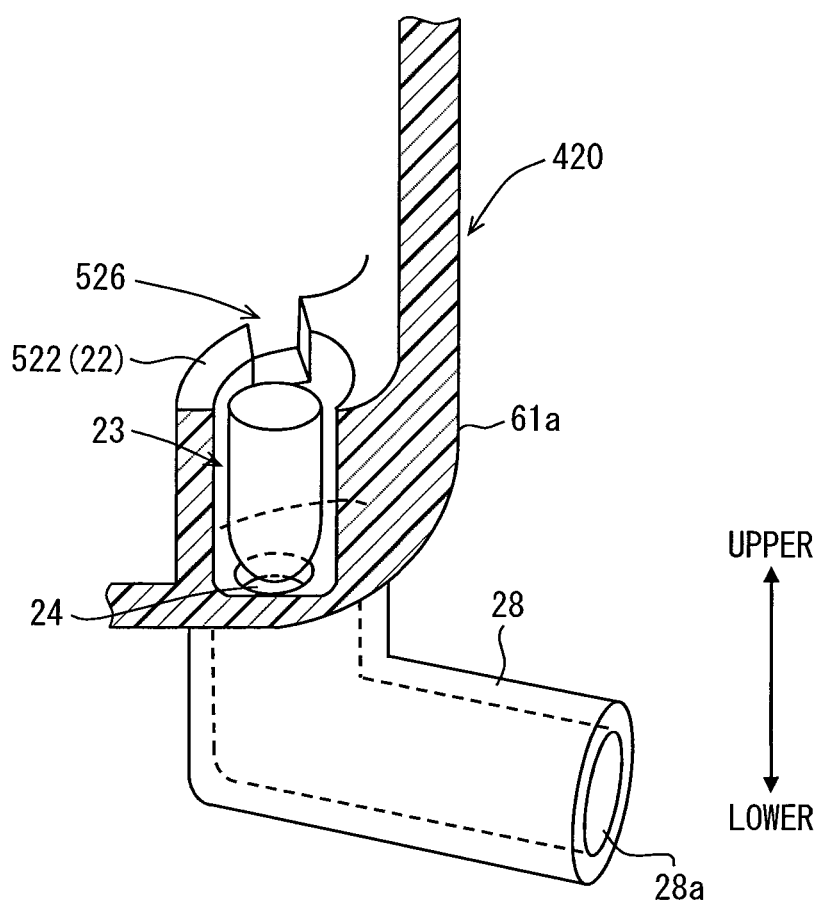
FIG. 9 is a perspective partial sectional view showing the water discharge device according to the fourth embodiment.

FIG. 9 is a partial perspective sectional view along IX-IX of FIG. 8, in which the valve member 23 described in the first embodiment is housed in the housing portion 22 formed by the peripheral wall portion 522. The peripheral wall portion 522 is formed so as to stand on the outer side covering an aperture portion 24 in a circumferential direction. A drain pipe 28 is installed below the aperture portion 24 in the drawing. The drain pipe 28 is of a larger diameter than the drain hose 21, and can communicate with the interior of the drain tank 61a via the aperture portion 24.

By being positioned on the radially inner side of the peripheral wall portion 522, the valve member 23 can be displaced in the opening direction and the closing direction, and can thus open or hermetically close the aperture portion 24. A slit 526 is formed in the peripheral wall portion 522. An upper end of the peripheral wall portion 522 in the drawing is in a position one step lower in the slit 526.

As shown in FIG. 8, condensed water dripping from an evaporator 81 is collected in the drain tank 61a, as heretofore described. The condensed water collected in the drain tank 61a is normally expelled to the exterior of the vehicle through the drain hose 21. However, in the event that, for example, insects build a nest in a lower end portion of the drain hose 21 in the drawing, thereby blocking the lower end portion, the condensed water cannot be expelled through the drain hose 21. When the level of condensed water accumulated in the drain tank 61a rises in this way, and as a result exceeds the upper end of a partition plate 61c, there is concern that the condensed water will flow out into a heater case 62 (FIG. 1).

Taking this concern into consideration, the water discharge device 420 according to this embodiment has the slit 526 in the peripheral wall portion 522. The upper end of the peripheral wall portion 522 is in a position lower than the upper end of the partition plate 61c in the slit 526. Consequently, at the stage at which the level of condensed water reaches the lower end of the slit 526, which is in a position lower than the upper end of the partition plate 61c, the condensed water is collected in the housing portion 22 formed by the peripheral wall portion 522. At the stage at which the level of the condensed water collected in the housing portion 22 in this way exceeds a predetermined value, the buoyancy of the condensed water acts on the valve member 23, and the valve member 23 floats. By the valve member 23 floating in this way being displaced in the opening direction, thereby opening the aperture portion 24, the condensed water is expelled through the aperture portion 24 and the drain pipe 28.

An outlet 28a of the drain pipe 28 according to this embodiment opens onto the interior of the chassis without penetrating a floor plate 300 of the chassis. The outlet 28a of the drain pipe 28 is positioned in a place inside the chassis in which there is no problem even when expelling condensed water, for example, a place sufficiently distanced from an electronic instrument such as an inverter or a battery. In this way, the drain pipe 28 conducts condensed water, and expels the condensed water in a predetermined position inside the vehicle. The configuration is such that the outlet 28a of the drain pipe 28 is positioned inside the vehicle, because of which a situation in which insects or the like build a nest in the drain pipe 28, thereby blocking the drain pipe 28, can be pre-empted. Also, as the drain pipe 28 is of a larger diameter than the drain hose 21, as heretofore described, the possibility of blockage is low.

Modification of Fourth Embodiment

Figure 10:
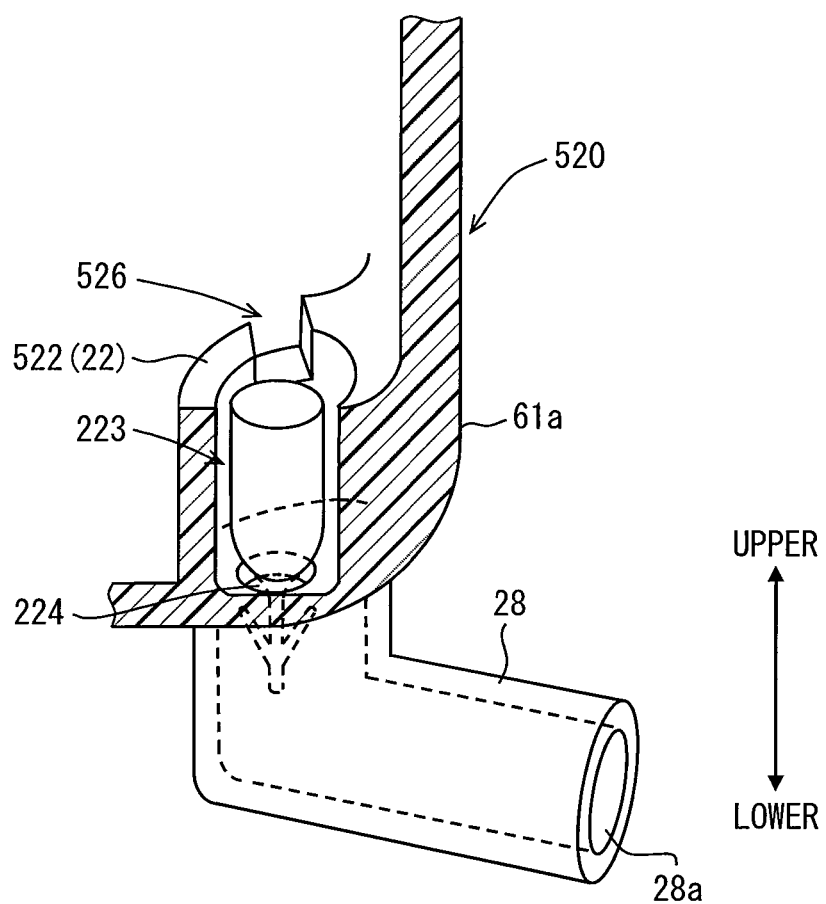
FIG. 10 is a perspective partial sectional view showing a water discharge device according to a modification of the fourth embodiment.

FIG. 10 is a partial perspective sectional view along X-X of FIG. 8. A water discharge device 520 according to a modification of the fourth embodiment shown in FIG. 10 is such that the valve member 223 described in the modification of the first embodiment is housed in the housing portion 22 formed by the peripheral wall portion 522 of the fourth embodiment. In this modification too, in the same way as in the modification of the first embodiment, an aperture portion 224 is smaller than the aperture portion 24 of the fourth embodiment. This modification is such that, in addition to the operational advantage described in the modification of the first embodiment, a situation in which the valve member 23 floats excessively with respect to the condensed water, and comes out of an upper outlet of the housing portion 22, can be avoided.

Fifth Embodiment

Figure 11:
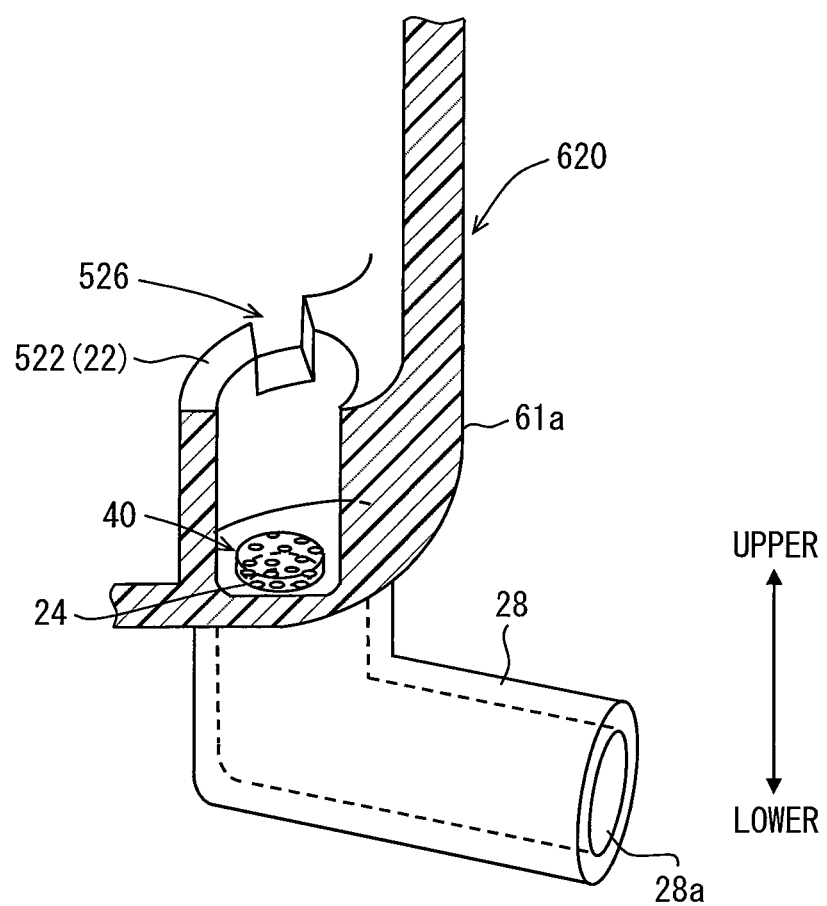
FIG. 11 is a perspective partial sectional view showing a water discharge device according to a fifth embodiment.

FIG. 11 is a partial perspective sectional view along XI-XI of FIG. 8. A water discharge device 620 according to a fifth embodiment shown in FIG. 11 is such that the porous member 40 described in the second embodiment is housed in the housing portion 22 formed by the peripheral wall portion 522 according to the fourth embodiment.

Sixth Embodiment

Figure 12:
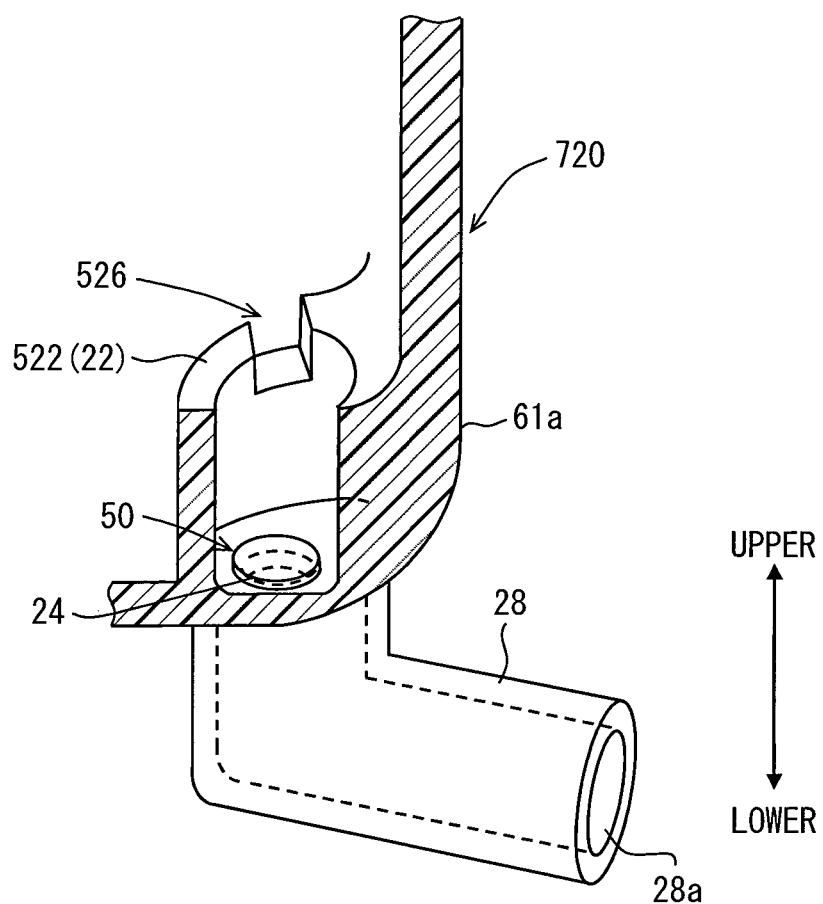
FIG. 12 is a perspective partial sectional view showing a water discharge device according to a sixth embodiment.

FIG. 12 is a partial perspective sectional view along XII-XII of FIG. 8. A water discharge device 720 according to a sixth embodiment shown in FIG. 12 is such that the water soluble member 50 described in the third embodiment is housed in the housing portion 22 formed by the peripheral wall portion 522 according to the fourth embodiment.

The valve member 23, the porous member 40, and the water soluble member 50 in the fourth to sixth embodiments correspond to an opening and closing member, in the same way as in the first to third embodiments. As heretofore described, the opening and closing members according to the fourth to sixth embodiments are installed in the interior of the air conditioning device 1. A water discharge device having this kind of configuration can be installed in, for example, a surplus space of the air conditioning device 1. In addition, an existing drain hose 21, a member supporting the drain hose 21, and the like, can be utilized. Consequently, parts such as the existing drain hose 21 can be appropriated, and a rise in cost can therefore be restricted.

The opening and closing member according to the fourth to sixth embodiments further includes a drain tank 61a, which can collect condensed water. The drain tank 61a forms the aperture portion 24, 224. The drain tank 61a has a peripheral wall portion 522 erected on the outer periphery of the aperture portion 24, 224. The peripheral wall portion 522 forms a housing portion 22. A water discharge device having this kind of configuration can be installed in, for example, a surplus space of the drain tank 61a. In addition, the peripheral wall portion 522 forms the housing portion 22 that houses the opening and closing member. A water discharge device having this kind of configuration is such that when the level of condensed water collected in the drain tank 61a exceeds a height stipulated by the peripheral wall portion 522, the condensed water exceeds the peripheral wall portion 522 and is collected in the housing portion 22.

A configuration in which the opening and closing member is the valve member 23, 223 is such that the valve member 23, 223 floats when the level of condensed water collected in the housing portion 22 exceeds the stipulated value, and separates from the aperture portion 24, 224, thereby opening the aperture portion 24, 224 and draining the condensed water. A configuration in which the opening and closing member is the porous member 40 is such that condensed water collected in the housing portion 22 permeates the porous member 40, and is drained through the aperture portion 24. Alternatively, a configuration in which the opening and closing member is the water soluble member 50 is such that condensed water collected in the housing portion 22 dissolves the water soluble member 50, and is drained through the aperture portion 24. In these cases, the peripheral wall portion 522 may be formed by a rib, or the like, integrally molded with the drain tank 61a, in which case the peripheral wall portion 522 functions as a component of the water discharge device while also increasing the rigidity of the drain tank 61a.

One portion of the upper end of the peripheral wall portion 522 has a slit 526 opening in a circumferential direction. A water discharge device configured in this way is such that when the level of condensed water collected in the drain tank 61a exceeds a position stipulated by the lower end of the slit 526, the condensed water exceeds the lower end of the slit 526 and is collected in the housing portion 22. That is, the level at which condensed water is collected in the housing portion 22 can be stipulated by the lower end of the slit 526. Because of this, the level at which condensed water is collected in the housing portion 22 can be set regardless of the height of the peripheral wall portion 522, while sufficiently maintaining the height of the peripheral wall portion 522 at a height of an extent to which, for example, the valve member 23, 223 can be displaced.

The air conditioning device 1 according to the disclosure includes the evaporator 81 configuring the refrigerating cycle and the case 61 housing the evaporator 81. The water discharge device is installed in the case 61, and drains condensed water generated in the evaporator 81. The water discharge device configured in this way is housed in the same case 61 as the evaporator 81. Because of this, the water discharge device can be installed on the periphery of the evaporator 81. Because of this, the water discharge device can effectively collect condensed water formed by air conditioning air that has passed through the evaporator 81 being dehumidified.

Seventh Embodiment

In a seventh embodiment, other aspects of each embodiment will be described, referring to FIG. 13 to FIG. 18. In FIG. 13 to FIG. 18, components of the same configuration as in the heretofore described embodiments are given the same reference signs, and achieve the same actions and advantages. Configurations, actions, and advantages not particularly described in the seventh embodiment are the same as in the heretofore described embodiments. Hereafter, only points differing from the heretofore described embodiments will be described. Also, components having the same configuration as in the heretofore described embodiments in the seventh embodiment are assumed to achieve the same actions and advantages as those described in the heretofore described embodiments.

Figure 13:
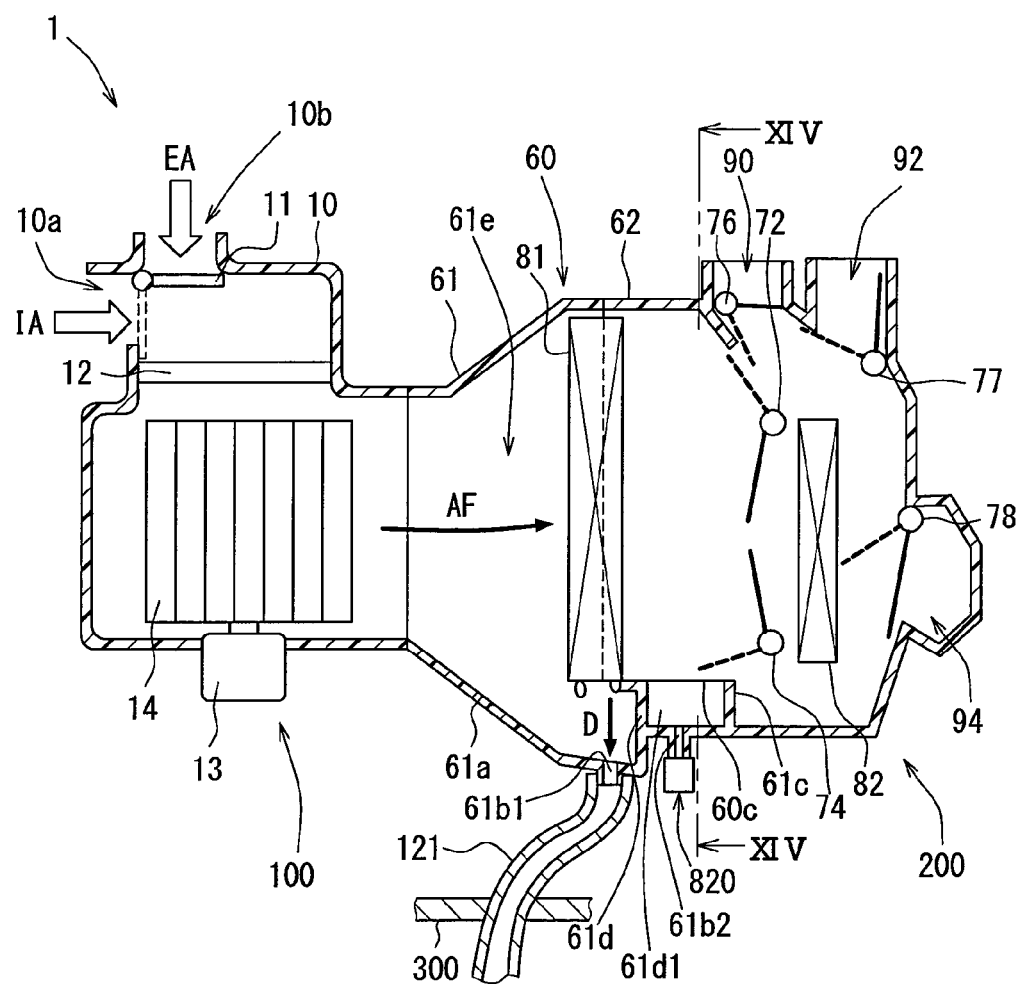
FIG. 13 is a schematic view showing a configuration of an air conditioning device including a water discharge device and a drain hose according to a seventh embodiment.
Figure 13:
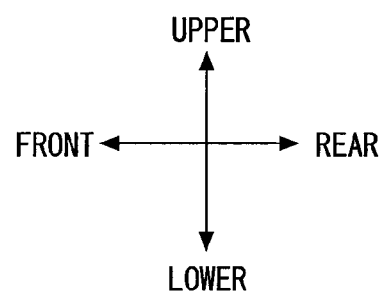
Figure 14:
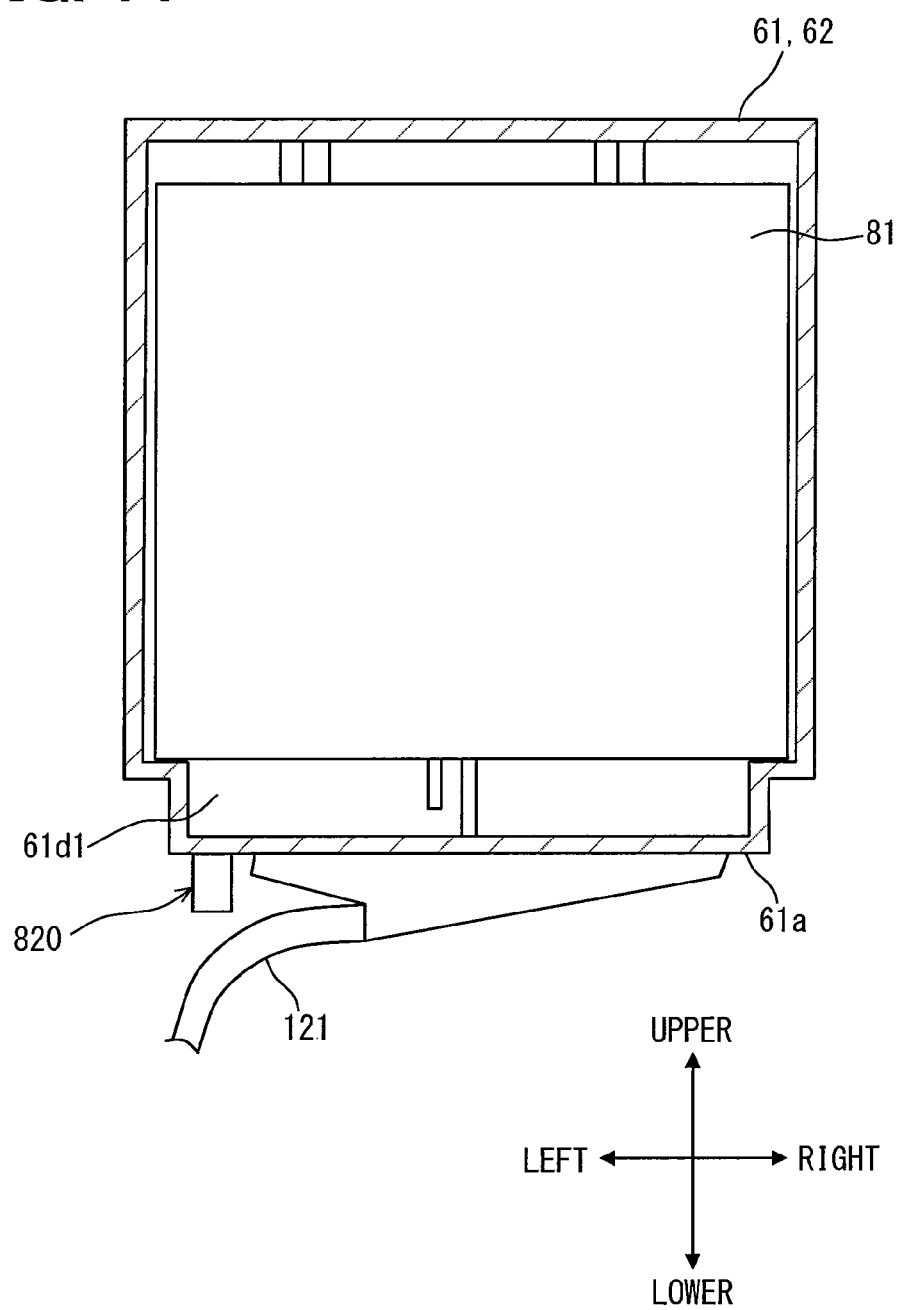
FIG. 14 is a schematic sectional view in which an XIV-XIV section in FIG. 13 is seen in the arrow direction.

As shown in FIG. 13 and FIG. 14, an air conditioning device 1 of the seventh embodiment includes a drain hose 121 and a water discharge device 820 installed in a drain tank 61a. Consequently, the air conditioning device 1 of the seventh embodiment includes two drainage means, those being the drain hose 121 and the water discharge device 820.

For example, when the drain hose 121 for draining condensed water dripping into a first drainage chamber below an evaporator 81 is blocked for some reason, and the condensed water flows to the water discharge device 820 side too, draining of the water discharge device 820 is necessary in order to satisfy drainage capacity. In this case, in the event that the water discharge device 820 cannot satisfy the necessary drainage capacity, condensed water accumulates to excess inside a case 61, and the condensed water may leak to the exterior from joints with a heater case 62. In the event that the leaked condensed water infiltrates an electrical part, there is concern that a breakdown will occur. Consequently, the disclosed water discharge device includes the configurations described in embodiments from the seventh embodiment onward in order that the water discharge device can satisfy a predetermined drainage capacity.

Also, with a device such as the air conditioning device 1 in which condensed water forms, there is concern about air leaking from the drainage path of the water discharge device, and about insufficient water discharge device drainage capacity, under various driving conditions and stress during actual use. Stress during actual use refers to when the internal pressure load inside the air conditioner case is high, when the vehicle assumes an inclined orientation, and the like.

The problem of air leaking is caused by, for example, the valve member of the water discharge device assuming a biased orientation when blocking the drainage path, and being unable to continually repeat an appropriate blocking state. Also, the problem of insufficient drainage capacity is caused by, for example, the valve member being unable to achieve a prompt opening when condensed water overflows to the water discharge device side due to blocking of the drain hose 121. Consequently, the disclosed water discharge device includes the configurations described in embodiments from the seventh embodiment onward in order that the water discharge device can include both drainability and sealability.

The drain hose 121 is connected to the drain tank 61*a* so as to communicate with a drain hole 61*b*1 formed in the drain tank 61*a*. The drain hose 121 penetrates a floor plate 300 of the vehicle and extends to the exterior of the vehicle passenger compartment. The drain hose 121 is formed of a resin material such as polypropylene or rubber, or the like. The drain hole 61*b*1 is provided in a bottom portion of the drain tank 61*a* positioned below the evaporator 81. Condensed water emanating from the evaporator 81 drips into, and collects in, the bottom portion of the drain tank 61*a*. Consequently, as the drain hose 121 causes the bottom portion of the interior of the case 61 and the exterior of the vehicle to communicate, condensed water emanating from the evaporator 81 can be expelled to the exterior of the vehicle.

A drain hole 61*b*2 linking the interior and exterior of the case 61 is provided in the drain tank 61*a*, in a position nearer than the drain hole 61*b*1 to a heater core 82, or in a position on the downstream side of the air flow. The water discharge device 820 is connected to the drain tank 61*a* so as to communicate with the drain hole 61*b*2. The water discharge device 820 communicates with the interior of the vehicle passenger compartment via an aperture portion 8213 of a bottom portion forming a drainage path. Consequently, water drained from the water discharge device 820 drips in the vicinity of the feet of a passenger inside the vehicle passenger compartment.

The drain hole 61*b*2 is positioned nearer than the evaporator 81 to the heater core 82, and positioned below the lower end of the evaporator 81. A partition wall 61*d* is a wall standing facing the lower end of the evaporator 81 from a bottom portion of the drain tank 61*a*. The partition wall 61*d* divides a space formed between the lower end of the evaporator 81 and the drain tank 61*a* into the first drainage chamber, in which the drain hole 61*b*1 is positioned, and a second drainage chamber 61*d*1, in which the drain hole 61*b*2 is positioned.

As shown in FIG. 13, the first drainage chamber is positioned nearer than the partition wall 61*d* to a blower unit 100 (on the upstream side of the air flow), configuring an upstream drainage tray including a region directly below the evaporator 81. The second drainage chamber 61*d*1 configures a downstream drainage tray in which a bottom portion of the case 61 downstream of the evaporator 81 is compartmentalized by at least the partition wall 61*d* and a partition plate 61*c*. The second drainage chamber 61*d*1 is a space provided below the evaporator 81, as shown in FIG. 13 and FIG. 14. The drain hole 61*b*2 is provided so as to be positioned below the evaporator 81, toward an end portion of the evaporator 81 in the width direction, in the vicinity of the end portion. Consequently, the drain hole 61*b*2 is provided in a place where air that has passed through the heat exchanger core portion of the evaporator 81 is unlikely to flow, in other words, a place, distanced from an air path, through which the main flow of conditioned air does not pass, and which does not affect the basic air conditioning performance.

Figure 15:
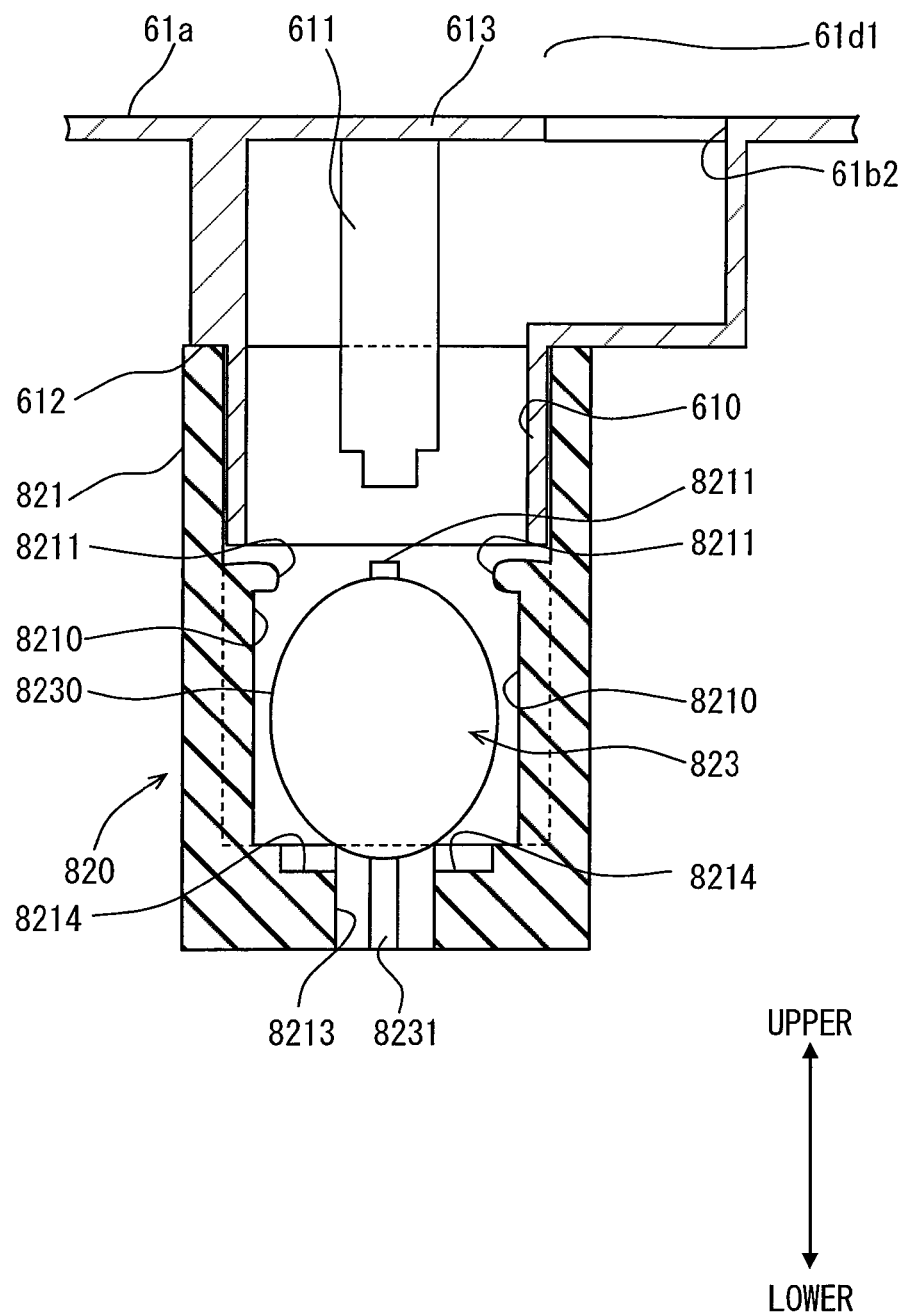
FIG. 15 is a partial sectional view showing the water discharge device according to the seventh embodiment.

As shown in FIG. 15, the water discharge device 820 is a float valve device including at least a valve member 823 and a housing portion 821 housing the valve member 823. The valve member 823 is an opening and closing member that is housed in the housing portion 821, and can be displaced in a vertical direction in the interior of the housing portion 821. The housing portion 821 is a tubular member of which one end is an open end while the other end is a bottom portion in which is formed the aperture portion 8213. The aperture portion 8213 configures a drainage path that penetrates a bottom portion of the housing portion 821. That is, the aperture portion 8213 configures a drainage path through which condensed water is able to drain in a draining state in which condensed water is expelled.

An attachment portion 610 in which the drain hole 61*b*2 is formed is provided in the case 61 of the air conditioning device 1. The open end side of the housing portion 821 is mounted on the attachment portion 610. The attachment portion 610 is a tubular body of which an upper portion communicates with the second drainage chamber 61*d*1 via the drain hole 61*b*2, while a lower portion is open. An abutment portion 612 against which the open end surface of the upper end of the housing portion 821 abuts is provided on the lower open side of the attachment portion 610. When the housing portion 821 is mounted so as to fit on the outer side of the attachment portion 610, the open end surface of the upper end of the housing portion 821 comes into contact with the abutment portion 612 and does not fit any deeper, because of which the worker carrying out the attachment can recognize that the mounting of the housing portion 821 is completed.

A roof portion 613 is provided adjacent to the attachment portion 610 on an upper portion of the attachment portion 610. The roof portion 613 forms one portion of the case 61, and works as a lid covering from above the housing portion 821 mounted on the attachment portion 610.

That is, the roof portion 613 is provided so as to cover from above the open end of the lower portion of the attachment portion 610 on which the housing portion 821 is mounted. Consequently, the drain hole 61*b*2 is provided in a position deviating from directly above the open end of the lower portion of the attachment portion 610. Condensed water flowing into the second drainage chamber 61d1 enters the interior of the attachment portion 610 from the drain hole 61b2, moves in a lateral direction, and flows down into the interior of the housing portion 821. Unless condensed water dripping down onto the roof portion 613 flows around to the drain hole 61b2 side, the condensed water cannot flow into the interior of the housing portion 821, meaning that spray flying from the evaporator 81 can be prevented from falling directly down into the interior of the housing portion 821. Consequently, an inflow of condensed water into the interior of the housing portion 821 due to spray can be restricted.

A guiding protruding portion 8210 having a predetermined length in the axial direction (vertical direction) of the housing portion 821, and of a form protruding from the inner peripheral surface, is integrally provided in the housing portion 821. The guiding protruding portion 8210 is a multiple of protruding portions partially protruding from the inner peripheral surface of the housing portion 821. The guiding protruding portion 8210 is a protruding portion having a surface extending in the axial direction of the valve member 823 housed in the housing portion 821.

Figure 16:
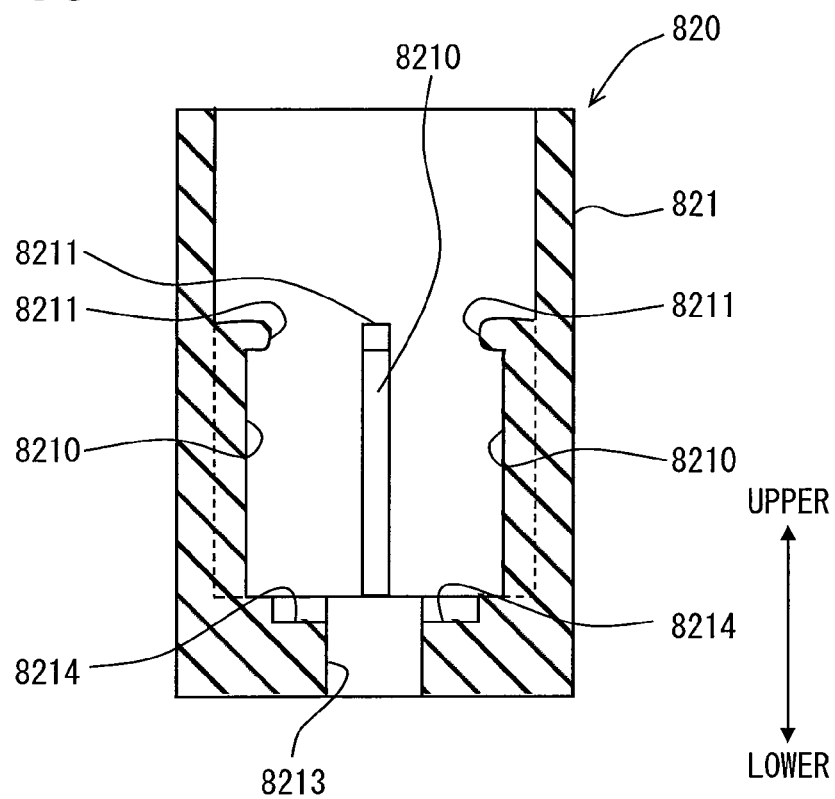
FIG. 16 is a sectional view showing a housing in the water discharge device of the seventh embodiment.
Figure 17:
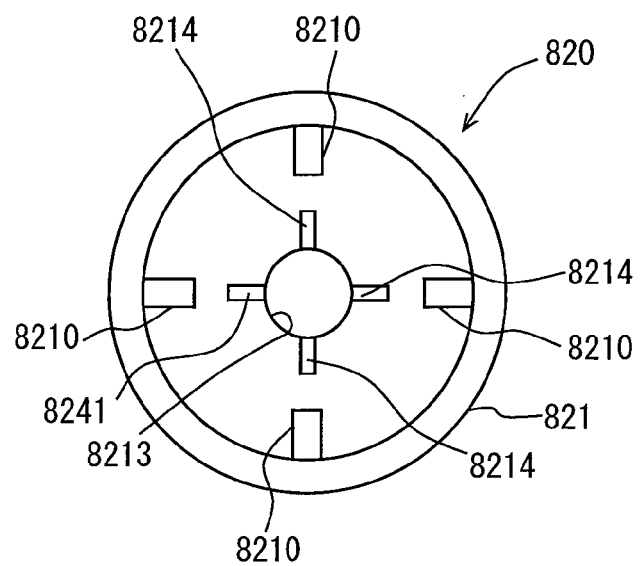
FIG. 17 is a plan view showing the housing of the seventh embodiment.

The guiding protruding portion 8210 extending in the axial direction of the housing portion 821 may be configured of a single rib extending continuously in the axial direction, or may be configured of a multiple of ribs extending intermittently in the axial direction. It is preferable that a multiple of the guiding protruding portion 8210 are provided at equal intervals in a circumferential direction on the inner peripheral surface of the housing portion 821, as shown in FIG. 16 and FIG. 17.

When the valve member 823 moves in the valve opening direction (upward direction) or valve closing direction (downward direction), the surface of a main body portion 8230 of the valve member 823 appropriately maintains a predetermined interval from the guiding protruding portion 8210. In other words, the movement of the valve member 823 is temporarily biased in one direction when the pressure inside the housing portion 821 fluctuates, or a water hammer caused by an inflow of condensed water acts, but the valve member 823 is guided by the guiding protruding portion 8210, and returns to a position maintaining the predetermined interval. Consequently, the guiding protruding portion 8210 regulates the amount of movement of the valve member 823 in a direction perpendicular to the axial direction, thereby appropriately guiding movement in the opening direction and the closing direction.

Also, when condensed water flows into the housing portion 821, a capillary phenomenon, whereby condensed water flows into a gap between the main body portion 8230 and the inner peripheral surface of the housing portion 821, occurs. The guiding protruding portion 8210 sets the gap so as to bring about the capillary phenomenon. Because of this, the guiding protruding portion 8210 can promote a downward flow of water caused by the capillary phenomenon, thereby also contributing to causing the valve member 823 to promptly move stably in the valve opening direction.

Figure 18:
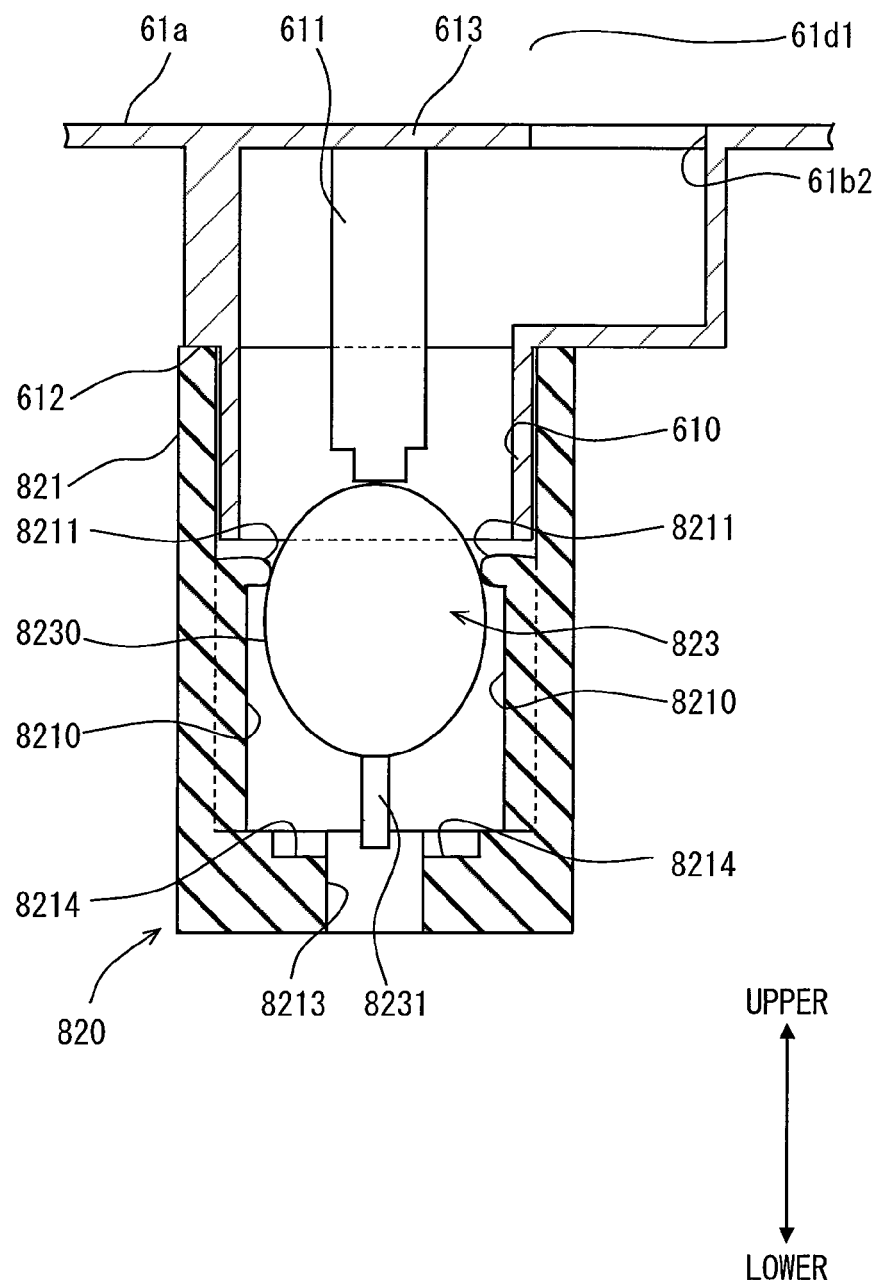
FIG. 18 is a view explaining a state in which upward displacement of a valve member is regulated in the water discharge device of the seventh embodiment.

A multiple of a retaining portion 8211 higher than the protruding height of the guiding protruding portion 8210 are provided on an upper portion of the guiding protruding portion 8210 or on the inner peripheral surface of the housing portion 821. The multiple of retaining portions 8211 include a group of retaining portions 8211 facing each other in a radial direction, as shown in FIG. 18. The water discharge device 820 includes one, or two or more, of the group of retaining portions 8211. As shown in FIG. 18, the main body portion 8230 is sandwiched by at least one group of retaining portions 8211 when the valve member 823 moves considerably in the opening direction (upward), whereby the valve member 823 can be regulated so as not to move any further in the opening direction (upward).

Furthermore, the water discharge device 820 includes a movement range regulating member 611 that comes into contact with the valve member 823, thereby regulating movement of the valve member 823 in the opening direction (upward). Consequently, whatever the orientation of the water discharge device 820, the lower end of the movement range regulating member 611 is the limit of displacement upward (to the case 61 side) of the valve member 823, and it does not happen that the valve member 823 exceeds the limit and moves nearer to the case 61 side. The movement range regulating member 611 is configured of a plate-form portion protruding downward from the lower surface of the roof portion 613.

The valve member 823 has the main body portion 8230, of which a sitting region of sphere form, egg form, or the like, is formed in a curved form, and a rod-form portion 8231 extending downward from a lower portion of the main body portion 8230. The rod-form portion 8231 is provided integrally with the main body portion 8230. When the valve member 823 moves in the opening direction and comes into contact with the movement range regulating member 611, as shown in FIG. 18, the rod-form portion 8231 is positioned on the inner side of the aperture portion 8213, that is, in the drainage path, without riding up on the bottom surface of the housing portion 821. Consequently, the rod-form portion 8231, in order that it does not ride up on the bottom surface of the housing portion 821, is set to a length of such an extent as to remain in the drainage path when the valve member 823 is separated from the aperture portion 8213 to the maximum limit inside the housing portion 821.

Even when the valve member 823 moves so as to separate by a considerable distance from the aperture portion 8213, and the rod-form portion 8231 comes into contact with the movement range regulating member 611, the valve member 823 comes into contact with the inner peripheral surface of the bottom portion forming the aperture portion 8213, because of which the valve member 823 does not incline to a large degree. When the water discharge device 820 assumes a predetermined installation bearing, the valve member 823 returns under its own weight to the closed valve state shown in FIG. 15, and can return to the predetermined installation bearing. In this way, even when a situation in which the valve member 823 is considerably displaced occurs, such as when the water discharge device 820 assumes an upside-down bearing, or the device is steeply inclined, before the attachment of the air conditioning device 1, the rod-form portion 8231 performs a function of regulating the movement, thereby returning the valve member 823 to the predetermined position.

The valve member 823 is formed of a material with a density lower than that of water. The valve member 823 can be formed of, for example, a hollow body. The housing portion 821 is formed of a resin material such as polypropylene or rubber, or the like. In particular, it is preferable that the housing portion 821 and the guiding protruding portion 8210 are integrally formed of a natural rubber or synthetic rubber having flexibility. From the point of view of working efficiency when attaching the housing portion 821 to the attachment portion 610, and working efficiency when inserting the valve member 823 into the housing portion 821, it is preferable that the material is one that can easily deform.

A groove portion 8214 connected with the aperture portion 8213 (drainage path) is provided in the bottom portion of the housing portion 821. It is preferable that a multiple of the groove portions 8214 are provided at equal intervals in the bottom portion of the housing portion 821, each extending radially from the aperture portion 8213. It is preferable that the depth of the groove portion 8214 is a minimal depth of an extent such that, in a state in which the valve member 823 is seated on the bottom portion of the housing portion 821 and closed, water flowing into the housing portion 821 flows through the groove portion 8214 owing to the capillary phenomenon, and flows down into the drainage path.

According to the seventh embodiment, the opening and closing member is configured of the valve member 823. The water discharge device 820 includes the housing portion 821, in which a drainage path (the aperture portion 8213) is formed. The housing portion 821 houses the valve member 823 so as to be displaceable in the opening direction, thereby opening the drainage path, and the closing direction, thereby blocking the drainage path. The non-draining state is a state in which the valve member 823 is seated under its own weight on the bottom portion of the housing portion 821, thereby blocking the drainage path. The draining state is a state in which the valve member 823 is displaced in the opening direction, thereby opening the drainage path. The housing portion 821 includes the guiding protruding portion 8210, which has a predetermined length in the axial direction (vertical direction) of the housing portion 821, and is of a form protruding from the inner peripheral surface. The guiding protruding portion 8210 regulates the amount of movement of the valve member 823 in a direction perpendicular to the axial direction of the housing portion 821, thereby guiding movement in the opening direction and the closing direction.

According to this configuration, movement of the valve member 823 in a direction (the radial direction) perpendicular to the opening direction and closing direction is regulated by the guiding protruding portion 8210 when the valve member 823 moves in the opening direction or closing direction. Even when the valve member 823 inclines or moves to an inappropriate position due to the action of air pressure, its own weight, a water hammer, buoyancy, or the like, inclination of the device, or the like, this is corrected, and the valve member 823 can move maintaining an appropriate gap from the guiding protruding portion 8210 or the inner peripheral surface of the housing portion 821. In this way, air pressure, the weight of the valve member 823, a water hammer, buoyancy, or the like can be caused to act appropriately on the valve member 823, because of which the valve member 823 can be caused to sit on the bottom portion of the housing portion 821, and to separate from the bottom portion, with an appropriate bearing. Consequently, a minimal gap with little bias can be formed between the valve member 823 and the housing portion 821 in the valve opening and valve closing processes, whereby the water discharge device 820 in which air leaks and insufficient drainage capacity can be prevented is obtained. According to the water discharge device 820, an air leak measured directly below the aperture portion 8213 can be kept to or below a predetermined air velocity when not draining. Also, according to the water discharge device 820, stable quality and performance can be secured with respect to various kinds of stress that may occur on the market.

Also, according to the water discharge device 820 and the air conditioning device 1 of the seventh embodiment, the problem described in the seventh embodiment is resolved. Also, a balance is achieved between air leak prevention when not draining and good drainage performance, and furthermore, drainage capacity can be supplemented when drainage capacity from the drain hose 121 is lost.

Also, the groove portion 8214 connecting with the drainage path is provided in the bottom portion of the housing portion 821. According to this configuration, the interior and exterior of the housing portion 821 communicate via the groove portion 8214 in a state in which the valve member 823 blocks the aperture portion 8213. As the valve member 823 is in contact with the bottom portion of the housing portion 821 in a portion other than the groove portion 8214, the valve can be closed to a level at which no noticeable leakage of air to the exterior occurs. When condensed water flows into the housing portion 821 in this closed valve state, a minimal amount of water flows into the groove portion 8214, and the capillary phenomenon occurs. Owing to this phenomenon, the valve member 823 is pushed upward (in the valve opening direction), because of which draining is further promoted, and the valve member 823 can be caused to move promptly in the valve opening direction. Consequently, a water discharge device 820 in which a shift from a closed valve state to an open valve state when condensed water flows in is swift, and good drainage performance is obtained with even a slight amount of water, can be provided.

Furthermore, it is preferable that a multiple of the groove portions 8214 are provided at equal intervals in the bottom portion of the housing portion 821, each extending radially from the drainage path. According to this configuration, the interior and exterior of the housing portion 821 communicate via the multiple of groove portions 8214 disposed radially and equally in a state in which the valve member 823 blocks the aperture portion 8213. When condensed water flows into the housing portion 821 in this closed valve state, a minimal amount of water flows into each of the multiple of groove portions 8214, and the capillary phenomenon occurs. Owing to the capillary phenomenon, whereby water flows equally into the aperture portion 8213 from the periphery, the valve member 823 can be pushed upward (in the valve opening direction) with a bearing that is unlikely to incline. Consequently, the valve member 823 can be lifted with an unbiased, stable bearing, because of which the valve member 823 is caused to move promptly in the valve opening direction, and drainage promotion is achieved.

Furthermore, the portion of the valve member 823 sitting on the bottom portion of the housing portion 821 is of a curved form. According to this configuration, the valve member 823 and the bottom portion of the housing portion 821 form an annular contact portion when the valve member 823 blocks the aperture portion 8213. That is, the valve member 823 is in linear contact with the bottom portion of the housing portion 821 rather than surface contact. Because of this, when condensed water flows into the housing portion 821 in the closed valve state, the valve member 823 can be caused to move promptly in the valve opening direction by a water hammer acting on the contact portion, in addition to the capillary phenomenon whereby a minimal amount of water flows through the groove portion 8214. Consequently, a water discharge device 820 in which a shift from a closed valve state to an open valve state when condensed water flows in is swift, and extremely responsive drainage is realized with even a slight amount of water, can be provided.

Also, by the sitting portion of the valve member 823 being of a curved form or a spherical form, the gap between the main body portion 8230 and a peripheral edge portion of the aperture portion 8213 can be formed with no bias in the circumferential direction, even assuming provisionally that the valve member 823 is seated or separates with an inclined bearing. Consequently, a water discharge device 820 in which a balance is achieved between drainage performance and airtightness performance can be provided.

Also, the movement range regulating member 611 regulates movement in the opening direction (upward) of the valve member 823 by coming into contact with the valve member 823. According to this configuration, a situation in which the valve member 823 moves too far in the opening direction, and does not return to the position required when closing the valve, can be avoided. This configuration is useful when the vehicle is steeply inclined, when the air conditioning device 1 is steeply inclined when carrying out attachment work, when the valve member 823 rises considerably due to the action of a sudden water hammer or large buoyancy, and the like.

Also, the valve member 823 includes the rod-form portion 8231 extending so as to have a length such that the rod-form portion 8231 is positioned in the drainage path when the valve member 823 moves in the closing direction, and is positioned in the drainage path when the valve member 823 moves in the opening direction and comes into contact with the movement range regulating member 611.

According to this configuration, the rod-form portion 8231 is in the drainage path when the valve member 823 comes into contact with the movement range regulating member 611, because of which inclination of the valve member 823 can be regulated even when the valve member 823 moves considerably in the opening direction. That is, as the rod-form portion 8231 does not leave the aperture portion 8213 upwardly, the valve member 823 can return to the predetermined position when the valve member 823 moves in the valve closing direction again. Consequently, a situation in which the valve member 823 does not return to the position required when closing the valve can be avoided. This configuration is also useful when the vehicle is steeply inclined, when the air conditioning device 1 is steeply inclined when carrying out attachment work, when the valve member 823 rises considerably due to the action of a sudden water hammer or large buoyancy, and the like.

Also, as the rod-form portion 8231 fulfills a function of condensed water falling along the rod-form portion 8231 when draining, the rod-form portion 8231 performs a function of preventing falling drained water from spraying to the periphery.

Also, it is preferable that the water discharge device 820 includes the roof portion 613, which covers from above the housing portion 821. According to this configuration, condensed water dripping from the evaporator 81 collides with the roof portion 613, and can be restricted from dripping directly down into the interior space of the housing portion 821. Consequently, a water discharge device with high resistance to condensed water spray from the evaporator 81 can be provided. As condensed water from the evaporator 81 does not drip directly down into the interior of the housing portion 821, the water discharge device 820 can be delayed from switching to an open valve state. Consequently, a situation in which the drain hose 121 is blocked, and water is drained into the vehicle passenger compartment from the water discharge device 820 because of spray before the first drainage chamber overflows, can be avoided. Also, when the user notices water draining from the water discharge device 820, it is time to clean, replace, or the like, the drain hose 121. Because of this, the water discharge device 820 can contribute to accurately informing the user that it is time for maintenance or time for replacement.

The housing portion 821 is a tubular member that can be mounted on the attachment portion 610, in which is formed the drain hole 61$b$2 for expelling condensed water and which is provided in the air conditioning device 1. According to this configuration, the water discharge device 820 that achieves the heretofore described advantages can be attached to the air conditioning device 1 by the housing portion 821, which is a tubular member, being mounted on the attachment portion 610 in a state in which the valve member 823 is housed in the housing portion 821. Consequently, a water discharge device 820 in which there are few man-hours and productivity is high can be provided.

Eighth Embodiment

Figure 19:
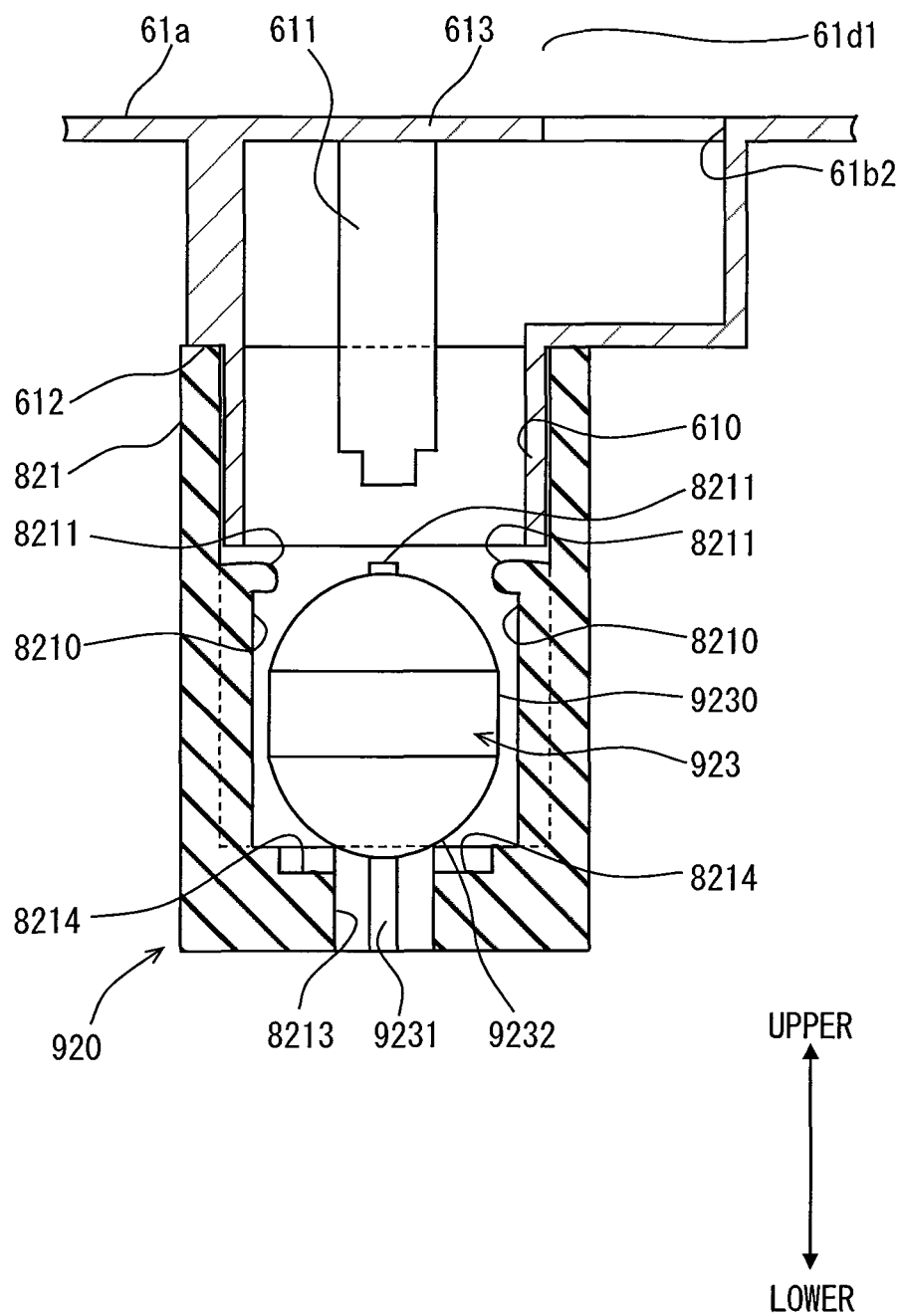
FIG. 19 is a partial sectional view showing a water discharge device according to an eighth embodiment.

In an eighth embodiment, a water discharge device 920, which is another aspect of the seventh embodiment, will be described, referring to FIG. 19. In FIG. 19, components of the same configuration as in the seventh embodiment are given the same reference signs, and achieve the same actions and advantages. Configurations, actions, and advantages not particularly described in the eighth embodiment are the same as in the seventh embodiment. Hereafter, only points differing from the heretofore described embodiments will be described. Also, components having the same configuration as in the heretofore described embodiments in the eighth embodiment are assumed to achieve the same actions and advantages as those described in the heretofore described embodiments.

As shown in FIG. 19, a valve member 923 includes a main body portion of a bullet form configured by, for example, combining a cylindrical-form portion and a hemispherical-form portion. The cylindrical-form portion includes a central portion in the axial direction of the main body portion. The hemispherical-form portion is disposed on both sides in the axial direction of the cylindrical-form portion. The cylindrical-form portion forms a side surface 9230 (cylinder surface) extending in the axial direction and parallel to the inner peripheral surface of a housing portion 821. Consequently, a gap between the side surface 9230 and the inner peripheral surface of the housing portion 821 is set so as to be practically constant.

Also, the valve member 923 has the main body portion and a rod-form portion 9231 extending downward from a lower portion of the main body portion. The rod-form portion 9231 is provided integrally with the main body portion. The rod-form portion 9231 achieves the same operational advantages as the rod-form portion 8231 described in the seventh embodiment.

According to the eighth embodiment, the valve member 923 is of an external form having the side surface 9230 extending in the axial direction parallel to the inner peripheral surface of the housing portion 821 extending in the axial direction. According to this configuration, the side surface 9230 of the cylindrical portion forms a constant gap extending in the axial direction from the guiding protruding portion 8210 or the inner peripheral surface of the housing portion 821 when the valve member 923 moves in the valve opening direction (upward direction) or the valve closing direction (downward direction). In other words, the movement of the valve member 923 is temporarily biased in one direction when the pressure inside the housing portion 821 fluctuates, or a water hammer caused by an inflow of condensed water acts. However, as the water discharge device 920 is such that a constant gap extending in the axial direction is formed, a force that promptly returns the valve member 923 to the axial center side of the housing portion 821 acts on the side surface 9230.

Also, when condensed water flows into the housing portion 821, a capillary phenomenon, whereby condensed water flows into the gap between the side surface 9230 and the inner peripheral surface of the housing portion 821, occurs. The guiding protruding portion 8210 and the side surface 9230 set the gap so as to bring about the capillary phenomenon. Because of this, the constant gap extending in the axial direction because of the side surface 9230 can promote a downward flow of water caused by the capillary phenomenon, and also contributes to promptly correcting the position of the valve member 923 to the axial center side.

Ninth Embodiment

Figure 20:
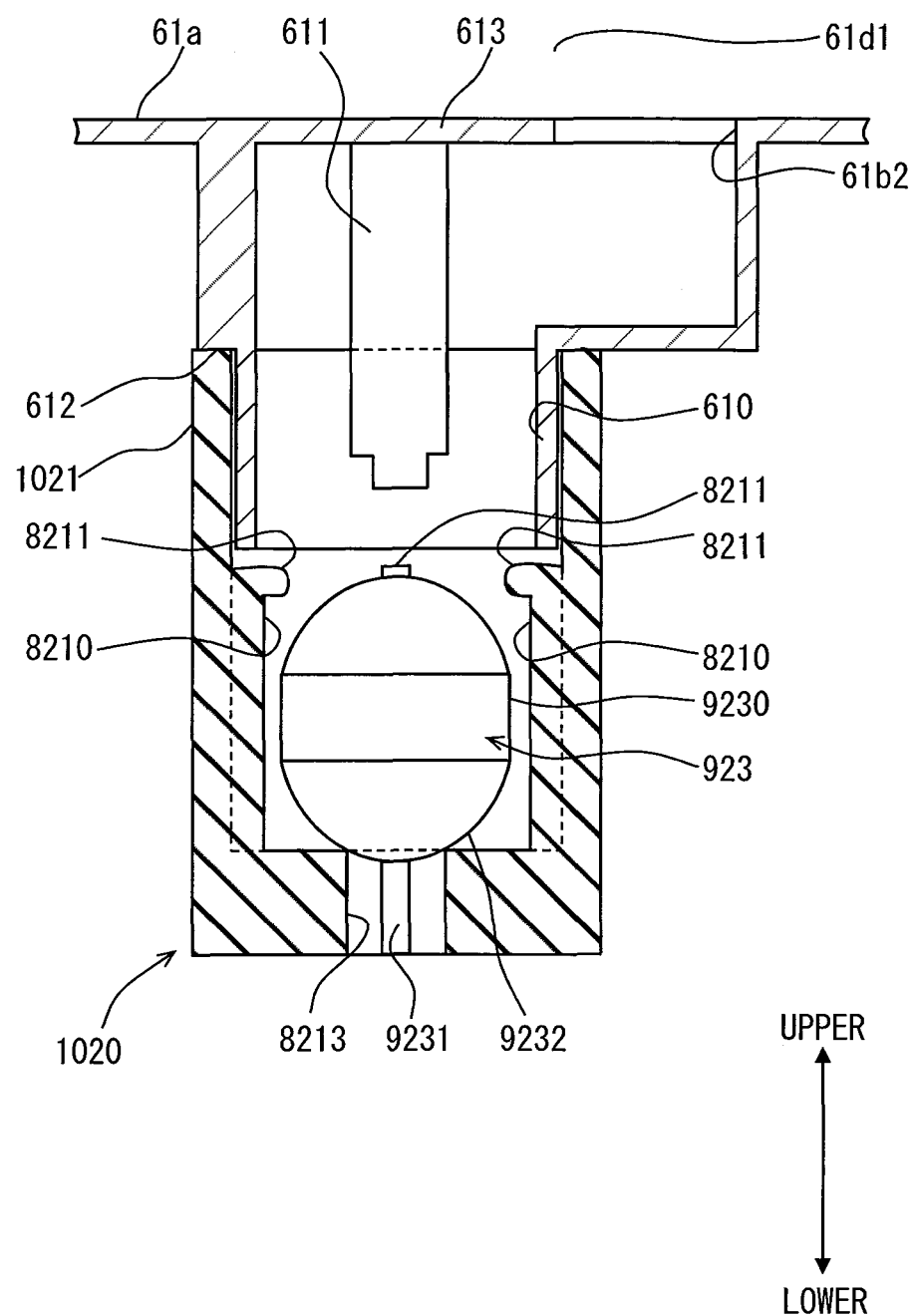
FIG. 20 is a partial sectional view showing a water discharge device according to a ninth embodiment.

In a ninth embodiment, a water discharge device 1020, which is another aspect of the seventh embodiment and the eighth embodiment, will be described, referring to FIG. 20. In FIG. 20, components of the same configuration as in the seventh embodiment and the eighth embodiment are given the same reference signs, and achieve the same actions and advantages. Configurations, actions, and advantages not particularly described in the ninth embodiment are the same as in the seventh embodiment and the eighth embodiment. Hereafter, only points differing from the heretofore described embodiments will be described. Also, components having the same configuration as in the heretofore described embodiments in the ninth embodiment are assumed to achieve the same actions and advantages as those described in the heretofore described embodiments.

Compared with the water discharge device 920 of the eighth embodiment, the water discharge device 1020 is a device of a configuration that does not have a groove portion in a bottom portion of a housing portion 1021.

According to the ninth embodiment, a valve member 923 is such that a sitting portion 9232 sitting on the bottom portion of the housing portion 1021 is of a curved form. According to this configuration, the sitting portion 9232 and the bottom portion of the housing portion 1021 form an annular contact portion when the valve member 923 blocks the aperture portion 8213. Because of this, the valve member 923 can reliably block the aperture portion 8213 when closed, and when condensed water flows into the housing portion 1021 in the closed valve state, the valve member 923 can be caused to move promptly in the valve opening direction by a water hammer acting on the contact portion. Consequently, even without the kind of groove portion described in the seventh embodiment being provided in a bottom portion of the housing portion 1021, the water discharge device 1020 in which a balance is achieved between air leak prevention when not draining and good drainage performance can be provided.

Also, by the sitting portion 9232 of the valve member 923 being of a curved form or a spherical form, the gap between the sitting portion 9232 and a peripheral edge portion of the aperture portion 8213 can be formed with no bias in the circumferential direction, even assuming provisionally that the valve member 923 is seated or separates with an inclined bearing. Consequently, the water discharge device 1020 in which a balance is achieved between drainage performance and airtightness performance can be provided.

Other Embodiment

While the desirable embodiment of the present disclosure is described, the present disclosure is not restricted to the embodiment mentioned, and can be implemented with various modification in the range not deviating from the scope of the present disclosure. The scope of the present disclosure is not limited to the range exemplified with the structure of the embodiment. The range of the present disclosure is shown by the appended claims, and also includes all the changes in the equivalence.

In the first embodiment, the valve member 23 is of a bullet form (cylindrical form), but this is not limiting. The spherical valve member 123 described as a comparison example using FIG. 4 may be employed, or a valve member of another form that can float owing to the buoyancy of condensed water may be employed.

In the first embodiment, the drain hose 21 and the housing portion 22 are formed as separate members, but this is not limiting. The drain hose 21 and the housing portion 22 may be molded integrally with each other.

In the fourth embodiment to the sixth embodiment, the peripheral wall portion 522 has the slit 526, but this is not limiting. It is acceptable that the peripheral wall portion 522 does not have the slit 526. In this case, it is conceivable for the upper end of the peripheral wall portion 522 to be set lower than the partition plate 61c of the case 61. By so doing, condensed water collected in the drain tank 61a exceeds the peripheral wall portion 522, and is collected in the housing portion 22 and expelled, without exceeding the partition plate 61c.

The outlet 28a of the drain pipe 28 described in the fourth embodiment to the sixth embodiment opens onto the interior of the chassis without penetrating the floor plate 300 of the chassis, but this is not limiting. The drain pipe 28 may penetrate the floor plate 300 of the chassis to communicate with the exterior of the vehicle, while the outlet 28a of the drain pipe 28 may open onto the exterior of the vehicle.

In the heretofore described embodiments, the water discharge device is mounted in an air conditioning device for a vehicle, but this is not limiting. The heretofore described water discharge device may be mounted in an air conditioning device for household use, industrial use, or the like.

What is claimed is:

1. A water discharge device that collects and drains condensed water generated in an air conditioning device, the water discharge device comprising: a drainage path along which condensed water is able to be drained in a draining state in which condensed water is expelled; and an opening and closing member that is able to block and open the drainage path, wherein the opening and closing member blocks the drainage path so as to limit movement of air due to dynamic pressure when in a non-draining state other than the draining state, the opening and closing member drains condensed water through the drainage path when in the draining state, the opening and closing member is a valve member, the water discharge device includes a housing portion, in which the drainage path is formed, that houses the valve member to be displaceable in an opening direction, whereby the drainage path is opened, and in a closing direction, whereby the drainage path is blocked, the non-draining state is a state in which the valve member is seated on a bottom portion of the housing portion by its own weight, thereby blocking the drainage path, the draining state is a state in which the valve member is displaced in the opening direction, thereby opening the drainage path, the bottom portion of the housing portion has a groove portion connected with the drainage path, and wherein a diameter of the valve member is larger than a diameter of the drainage path and smaller than an overall diameter of the groove portion; the groove portion is rectangular in shape; and the drainage path penetrates the bottom portion of the housing portion.

2. The water discharge device according to claim 1, further comprising:

a movement range regulating member that regulates movement of the valve member in the opening direction by coming into contact with the valve member.

3. The water discharge device according to claim 2, wherein the valve member further includes a rod-form portion that is positioned in the drainage path when the valve member moves in the closing direction, and that extends to have a length such that the rod-form portion is positioned in the drainage path when the valve member moves in the opening direction and comes into contact with the movement range regulating member.

4. The water discharge device according to claim 1, wherein the housing portion is able to collect condensed water in the interior thereof, the valve member hermetically blocks the drainage path by being seated on the bottom portion of the housing portion by its own weight, and the valve member is displaced in the opening direction by floating in condensed water collected in the housing portion, thereby creating the draining state to open the drainage path by separating from the drainage path.

5. The water discharge device according to claim 4, wherein the valve member is of a cylindrical form.

6. The water discharge device according to claim 4, wherein the valve member includes a main body portion, a leading end portion extending from an end of the main body portion, and a folded portion extending radially in a radial direction from the leading end portion, the housing portion has a wall portion in which the drainage path is defined, the leading end portion passes through the wall portion such that the main body portion is positioned on an opposite side of the wall portion from the leading end portion and the folded portion, the main body portion hermetically blocks the drainage path by being seated on the wall portion by its own weight, and the folded portion limits displacement of the main body portion in the opening direction by coming into contact with the wall portion in a state where the main body portion is separated from the wall portion.

7. The water discharge device according to claim 1, further comprising:

a drain tank that is able to collect condensed water, wherein the drain tank defines the drainage path, the drain tank has a peripheral wall portion erected on an outer side of the drainage path, and the peripheral wall portion defines a part of the housing portion.

8. The water discharge device according to claim 7, wherein the peripheral wall portion has a slit opening in a circumferential direction at an upper end of the peripheral wall portion.

9. The water discharge device according to claim 1, wherein:

the bottom portion of the housing portion has a flat upper surface; and the groove portion is formed in the flat upper surface, and is connected with the drainage path.

10. The water discharge device according to claim 9, wherein:

the groove portion further comprising a plurality of groove portions located at equally spaced intervals in the bottom portion of the housing portion, each extending radially from the drainage path.

11. The water discharge device according to claim 1, wherein the housing portion includes a guiding protruding portion protruding from an inner peripheral surface of the housing portion and having a predetermined length in an axial direction of the housing portion to regulate a movement amount of the valve member in a direction perpendicular to the axial direction, thereby guiding movement in the opening direction and the closing direction.

12. The water discharge device according to claim 1, wherein the groove portion is plurally provided at equal intervals in the bottom portion of the housing portion, each extending radially from the drainage path.

13. The water discharge device according to claim 1, wherein the valve member has a curved portion to be seated on the bottom portion of the housing portion.

14. The water discharge device according to claim 1, wherein the housing portion is a tubular body, and the valve member is of an external form having a side surface extending parallel to the inner peripheral surface of the housing portion extending in the axial direction.

15. The water discharge device according to claim 1, further comprising:

a roof portion that covers an upper side of the housing portion.

16. The water discharge device according to claim 1, wherein the housing portion is a tubular member attachable to an attachment portion of the air conditioning device in which a drain hole is defined for expelling the condensed water.

17. The water discharge device according to claim 1, wherein the opening and closing member is made of a porous member, which is porous and covers the drainage path, the water discharge device further includes a housing portion, in which the drainage path is formed, that houses the porous member and that is able to collect condensed water in the interior thereof, and the porous member creates the draining state by absorbing collected condensed water and swelling, and the absorbed condensed water is drained from the drainage path when flowing out from the porous member.

18. The water discharge device according to claim 1, wherein the opening and closing member is made of a water soluble member, which is water soluble, covers the drainage path, and hermetically blocks the drainage path, the water discharge device further includes a housing portion, in which the drainage path is formed, that houses the water soluble member and that is able to collect condensed water in the interior thereof, and the draining state is created by the water soluble member being dissolved in collected condensed water to open the drainage path.

19. The water discharge device according to claim 1, wherein the opening and closing member is installed at a leading end or inside of a drain hose positioned outside of the air conditioning device.

20. The water discharge device according to claim 1, wherein
the opening and closing member is installed inside the air conditioning device.

21. An air conditioning device comprising:
an evaporator configuring a refrigerating cycle;
a case that houses the evaporator; and
the water discharge device according to claim 1 installed in the case, wherein
the water discharge device drains condensed water generated in the evaporator.

22. The water discharge device according to claim 1, wherein:
the valve member has a main curved-form portion and a rod-form portion extending from the main curved-form portion in a rod extending direction;
the drainage path extends only in the rod extending direction; and
the groove has a predetermined depth that is smaller than the rod-form portion in the rod extending direction.

\* \* \* \* \*